US011137980B1

(12) United States Patent
Animesh et al.

(10) Patent No.: US 11,137,980 B1
(45) Date of Patent: Oct. 5, 2021

(54) MONOTONIC TIME-BASED DATA STORAGE

(71) Applicant: Amazon Technologies, Inc., Seattle, WA (US)

(72) Inventors: Rishabh Animesh, Seattle, WA (US); Adam Frederick Brock, Seattle, WA (US); Umar Farooq, Mercer Island, WA (US); James Caleb Kirschner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 455 days.

(21) Appl. No.: 15/277,922

(22) Filed: Sep. 27, 2016

(51) Int. Cl.
*G06F 7/08* (2006.01)
*G06F 16/22* (2019.01)
*G06F 16/25* (2019.01)

(52) U.S. Cl.
CPC ............. *G06F 7/08* (2013.01); *G06F 16/22* (2019.01); *G06F 16/252* (2019.01)

(58) Field of Classification Search
CPC ........... G06F 7/08; G06F 16/22; G06F 16/252
See application file for complete search history.

(56) References Cited

U.S. PATENT DOCUMENTS

| 5,488,701 | A  | 1/1996  | Brady et al.    |
|-----------|----|---------|-----------------|
| 5,729,671 | A  | 3/1998  | Peterson et al. |
| 6,249,836 | B1 | 6/2001  | Downs et al.    |
| 6,665,565 | B1 | 12/2003 | Stomberg et al. |
| 6,779,150 | B1 | 8/2004  | Walton et al.   |
| 6,862,362 | B2 | 3/2005  | Gangadhar       |
| 6,922,700 | B1 | 7/2005  | Aggarwal et al. |
| 7,117,294 | B1 | 10/2006 | Mi et al.       |
| 7,142,150 | B2 | 11/2006 | Thackray        |
| 7,380,129 | B2 | 5/2008  | Keohane et al.  |
| 7,418,478 | B1 | 8/2008  | Oiling et al.   |
| 7,490,013 | B2 | 2/2009  | Wells           |
| 7,693,813 | B1 | 4/2010  | Cao et al.      |
| 7,783,600 | B1 | 8/2010  | Spertus et al.  |
| 7,805,706 | B1 | 9/2010  | Ly et al.       |

(Continued)

FOREIGN PATENT DOCUMENTS

| JP | 2004531923 A | 10/2004 |
|----|--------------|---------|
| JP | 5858506 B1   | 2/2016  |

(Continued)

OTHER PUBLICATIONS

Amazon, "Batch Cloud Data Transfer Services—Amazon Import/Export Snowball Appliance," Jun. 17, 2016, retrieved Oct. 8, 2016, https://web.archive.org/web/20160617044144/http://aws.amazon.com/importexport/, 6 pages.

(Continued)

*Primary Examiner* — Tamara T Kyle
*Assistant Examiner* — Lahcen Ennaji
(74) *Attorney, Agent, or Firm* — Davis Wright Tremaine LLP

(57) ABSTRACT

A data storage system implements techniques for efficient retrieval of data stored thereon, using time of upload or another monotonically increasing variable as a key or identifier for the data to be stored and/or retrieved. Data is sorted according to, e.g., upload time, and the data is addressed with respect to time of upload and byte offset within the archive.

20 Claims, 11 Drawing Sheets

(56) References Cited

U.S. PATENT DOCUMENTS

| | | |
|---|---|---|
| 7,930,611 B2 | 4/2011 | Huang et al. |
| 8,261,033 B1 | 9/2012 | Slik et al. |
| 8,386,841 B1 | 2/2013 | Renade |
| 8,391,226 B2 | 3/2013 | Rune |
| 8,413,187 B1 | 4/2013 | Del Sesto et al. |
| 8,479,078 B2 | 7/2013 | Resch et al. |
| 8,504,518 B1 | 8/2013 | Ghemawat et al. |
| 8,504,535 B1 | 8/2013 | He et al. |
| 8,612,219 B2 | 12/2013 | Tsuchinaga et al. |
| 8,621,069 B1 | 12/2013 | Tompkins |
| 8,706,980 B2 | 4/2014 | Dhuse et al. |
| 8,769,049 B2 | 7/2014 | Murphy et al. |
| 8,788,855 B2 | 7/2014 | Cong et al. |
| 8,806,296 B1 | 8/2014 | Lazier |
| 8,850,288 B1 | 9/2014 | Lazier et al. |
| 8,868,825 B1 | 10/2014 | Hayes et al. |
| 8,869,001 B1 | 10/2014 | Lazier |
| 8,935,221 B1 | 1/2015 | Lazier et al. |
| 8,935,761 B2 | 1/2015 | Gladwin et al. |
| 8,938,591 B2 | 1/2015 | Mark et al. |
| 8,959,067 B1 | 2/2015 | Patiejunas et al. |
| 8,984,363 B1 | 3/2015 | Juels et al. |
| 8,984,384 B1 | 3/2015 | Juels et al. |
| 9,002,805 B1 | 4/2015 | Barber et al. |
| 9,003,144 B1 | 4/2015 | Hayes et al. |
| 9,009,491 B2 | 4/2015 | Resch |
| 9,021,297 B1 | 4/2015 | Hayes et al. |
| 9,047,214 B1 | 6/2015 | Northcott |
| 9,052,942 B1 | 6/2015 | Barber et al. |
| 9,092,441 B1 | 7/2015 | Patiejunas et al. |
| 9,110,797 B1 | 8/2015 | Lazier |
| 9,165,002 B1 | 10/2015 | Lazier |
| 9,208,018 B1 | 12/2015 | Northcott et al. |
| 9,213,485 B1 | 12/2015 | Hayes et al. |
| 9,213,709 B2 | 12/2015 | Patiejunas et al. |
| 9,218,244 B1 | 12/2015 | Hayes et al. |
| 9,223,789 B1 | 12/2015 | Seigle et al. |
| 9,225,675 B2 | 12/2015 | Patiejunas et al. |
| 9,244,761 B2 | 1/2016 | Yekhanin et al. |
| 9,250,811 B1 | 2/2016 | Patiejunas |
| 9,251,097 B1 | 2/2016 | Kumar et al. |
| 9,256,467 B1 | 2/2016 | Singh et al. |
| 9,256,761 B1 | 2/2016 | Sahu et al. |
| 9,270,683 B2 | 2/2016 | Coughlin et al. |
| 9,271,052 B2 | 2/2016 | Holden |
| 9,281,845 B1 | 3/2016 | Lazier |
| 9,298,760 B1 | 3/2016 | Li et al. |
| 9,313,172 B1 | 4/2016 | Brandwine |
| 9,354,683 B2 | 5/2016 | Patiejunas et al. |
| 9,378,084 B2 | 6/2016 | Calder et al. |
| 9,405,333 B1 | 8/2016 | Pine |
| 9,448,614 B2 | 9/2016 | Slik |
| 9,449,346 B1 | 9/2016 | Hockey et al. |
| 9,459,959 B1 | 10/2016 | Franklin et al. |
| 9,461,876 B2 | 10/2016 | Van Dusen et al. |
| 9,489,832 B2 | 11/2016 | Nair et al. |
| 9,495,249 B1 | 11/2016 | Franklin et al. |
| 9,495,255 B2 | 11/2016 | Davis et al. |
| 9,513,820 B1 | 12/2016 | Shalev |
| 9,563,681 B1 | 2/2017 | Patiejunas et al. |
| 9,672,110 B1 | 6/2017 | Patel |
| 9,753,669 B2 | 9/2017 | Ben-Shaul et al. |
| 9,785,495 B1 | 10/2017 | Lazier et al. |
| 9,792,179 B1 | 10/2017 | Lazier |
| 9,825,625 B2 | 11/2017 | Thalheim |
| 9,825,652 B1 | 11/2017 | Lazier |
| 9,838,041 B1 | 12/2017 | Lazier |
| 9,838,042 B1 | 12/2017 | Lazier |
| 9,853,662 B1 | 12/2017 | Lazier et al. |
| 9,866,242 B1 | 1/2018 | Lazier |
| 9,904,589 B1 | 2/2018 | Donlan et al. |
| 9,923,966 B1 | 3/2018 | Franklin et al. |
| 9,934,389 B2 | 4/2018 | Paterra et al. |
| 9,998,539 B1 | 6/2018 | Brock et al. |
| 10,061,668 B1 | 8/2018 | Lazier et al. |
| 10,083,030 B1 | 9/2018 | Fant, IV et al. |
| 10,097,356 B2 | 10/2018 | Zinder |
| 10,645,582 B2 | 5/2020 | Wohlert et al. |
| 2003/0032417 A1 | 2/2003 | Minear et al. |
| 2003/0172325 A1 | 9/2003 | Wyatt et al. |
| 2004/0040025 A1 | 2/2004 | Lehtinen |
| 2004/0054997 A1 | 3/2004 | Katragadda et al. |
| 2004/0128470 A1 | 7/2004 | Hetzler et al. |
| 2004/0221138 A1* | 11/2004 | Rosner ............. G06F 9/3885 712/218 |
| 2004/0230764 A1 | 11/2004 | Merchant et al. |
| 2004/0268037 A1 | 12/2004 | Buchanan et al. |
| 2006/0004675 A1 | 1/2006 | Bennett et al. |
| 2006/0064709 A1 | 3/2006 | Throckmorton et al. |
| 2006/0074954 A1 | 4/2006 | Hartline et al. |
| 2006/0080574 A1 | 4/2006 | Saito et al. |
| 2006/0117217 A1 | 6/2006 | Chien et al. |
| 2006/0136928 A1 | 6/2006 | Crawford et al. |
| 2006/0168575 A1 | 7/2006 | Bhatt et al. |
| 2006/0168581 A1 | 7/2006 | Goger et al. |
| 2007/0118657 A1 | 5/2007 | Kreitzer et al. |
| 2007/0124020 A1 | 5/2007 | Staples |
| 2007/0156842 A1 | 7/2007 | Vermeulen et al. |
| 2007/0180294 A1 | 8/2007 | Kameyama et al. |
| 2007/0245331 A1 | 10/2007 | Daynes et al. |
| 2008/0033914 A1 | 2/2008 | Chemiack et al. |
| 2008/0189705 A1 | 8/2008 | Weinert et al. |
| 2009/0094250 A1 | 4/2009 | Dhuse et al. |
| 2009/0319078 A1 | 12/2009 | Jackson |
| 2010/0131792 A1 | 5/2010 | Herrod |
| 2010/0138764 A1 | 6/2010 | Hatambeiki et al. |
| 2010/0153941 A1 | 6/2010 | Borissov et al. |
| 2010/0306267 A1 | 12/2010 | Zamkoff et al. |
| 2010/0318999 A1 | 12/2010 | Zhao et al. |
| 2010/0328528 A1 | 12/2010 | Eggert |
| 2010/0332751 A1 | 12/2010 | Quigley et al. |
| 2011/0022633 A1 | 1/2011 | Bemosicy et al. |
| 2011/0055661 A1 | 3/2011 | Grube et al. |
| 2011/0078277 A1 | 3/2011 | Baptist |
| 2011/0202929 A1 | 8/2011 | Schleimer et al. |
| 2011/0225209 A1 | 9/2011 | Volvovski et al. |
| 2011/0225426 A1 | 9/2011 | Agarwal et al. |
| 2011/0264717 A1 | 10/2011 | Grube et al. |
| 2011/0289263 A1 | 11/2011 | McWilliams et al. |
| 2011/0296195 A1 | 12/2011 | Nakagawa et al. |
| 2011/0296440 A1 | 12/2011 | Laurich et al. |
| 2012/0011398 A1 | 1/2012 | Eckhardt et al. |
| 2012/0017096 A1 | 1/2012 | Snider |
| 2012/0079189 A1 | 3/2012 | Colgrove et al. |
| 2012/0079190 A1 | 3/2012 | Colgrove et al. |
| 2012/0110150 A1 | 5/2012 | Kosuru et al. |
| 2012/0185437 A1 | 7/2012 | Pavlov et al. |
| 2012/0226933 A1 | 9/2012 | Baptist et al. |
| 2012/0243687 A1 | 9/2012 | Li et al. |
| 2012/0254089 A1 | 10/2012 | Alba et al. |
| 2012/0254175 A1 | 10/2012 | Horowitz et al. |
| 2012/0254690 A1 | 10/2012 | Resch et al. |
| 2012/0290539 A1 | 11/2012 | Bryant et al. |
| 2012/0297311 A1 | 11/2012 | Duggal |
| 2012/0310878 A1 | 12/2012 | Vuksan et al. |
| 2012/0322422 A1 | 12/2012 | Frecks, Jr. et al. |
| 2012/0331088 A1 | 12/2012 | O'Hare et al. |
| 2013/0007511 A1 | 1/2013 | Gaertner et al. |
| 2013/0029641 A1 | 1/2013 | Hickie |
| 2013/0066882 A1* | 3/2013 | Westbrooke ........ G06F 16/2477 707/746 |
| 2013/0073600 A1 | 3/2013 | Jenkins et al. |
| 2013/0109371 A1 | 5/2013 | Brogan et al. |
| 2013/0151653 A1 | 6/2013 | Sawicki et al. |
| 2013/0159646 A1* | 6/2013 | Atzmon ............. G06F 11/1451 711/162 |
| 2013/0191527 A1 | 7/2013 | Ashok et al. |
| 2013/0238932 A1 | 9/2013 | Resch |
| 2013/0275776 A1 | 10/2013 | Baptist et al. |
| 2013/0297964 A1 | 11/2013 | Hegdal et al. |
| 2013/0304711 A1 | 11/2013 | Resch |
| 2013/0326583 A1 | 12/2013 | Freihold et al. |
| 2014/0006458 A1 | 1/2014 | Hsieh et al. |
| 2014/0006850 A1 | 1/2014 | Alley et al. |

(56) References Cited

U.S. PATENT DOCUMENTS

| | | |
|---|---|---|
| 2014/0007214 A1 | 1/2014 | Qureshi et al. |
| 2014/0046906 A1 | 2/2014 | Patiejunas et al. |
| 2014/0046908 A1 | 2/2014 | Patiejunas et al. |
| 2014/0046909 A1 | 2/2014 | Patiejunas et al. |
| 2014/0047040 A1 | 2/2014 | Patiejunas et al. |
| 2014/0047261 A1 | 2/2014 | Patiejunas et al. |
| 2014/0052694 A1* | 2/2014 | Dasari ............... G06F 11/1461 707/654 |
| 2014/0089264 A1* | 3/2014 | Talagala ............. G06F 3/0616 707/649 |
| 2014/0108421 A1 | 4/2014 | Isaacson et al. |
| 2014/0122572 A1 | 5/2014 | Finkelstein et al. |
| 2014/0149794 A1 | 5/2014 | Shetty et al. |
| 2014/0149986 A1 | 5/2014 | S M et al. |
| 2014/0153481 A1 | 6/2014 | Draznin et al. |
| 2014/0156632 A1 | 6/2014 | Yu et al. |
| 2014/0173058 A1 | 6/2014 | Twitchell, Jr. |
| 2014/0189388 A1 | 7/2014 | Lynar et al. |
| 2014/0201541 A1 | 7/2014 | Paul et al. |
| 2014/0207680 A1 | 7/2014 | Rephlo |
| 2014/0298134 A1 | 10/2014 | Grube et al. |
| 2014/0304356 A1 | 10/2014 | Allen, Sr. et al. |
| 2014/0310571 A1 | 10/2014 | Fetterly et al. |
| 2014/0310792 A1 | 10/2014 | Hyland et al. |
| 2014/0344446 A1 | 11/2014 | Rjeili et al. |
| 2014/0351632 A1 | 11/2014 | Grube et al. |
| 2014/0351917 A1 | 11/2014 | Chickering |
| 2014/0372383 A1 | 12/2014 | Sipek |
| 2014/0380126 A1 | 12/2014 | Yekhanin et al. |
| 2015/0058473 A1 | 2/2015 | Grande |
| 2015/0120749 A1* | 4/2015 | Phanishayee ........ G11B 27/034 707/741 |
| 2015/0149870 A1 | 5/2015 | Kozat |
| 2015/0154111 A1 | 6/2015 | D'Abreu et al. |
| 2015/0169716 A1 | 6/2015 | Franklin et al. |
| 2015/0175333 A1 | 6/2015 | Richardson et al. |
| 2015/0256423 A1 | 9/2015 | Stearns |
| 2015/0278324 A1 | 10/2015 | Wong et al. |
| 2015/0324745 A1 | 11/2015 | Goodall et al. |
| 2015/0331635 A1 | 11/2015 | Ben-Shaul et al. |
| 2015/0347443 A1* | 12/2015 | Reid ................... G06F 16/1744 707/693 |
| 2015/0350316 A1 | 12/2015 | Calder et al. |
| 2015/0350362 A1 | 12/2015 | Pollack et al. |
| 2015/0355974 A1 | 12/2015 | Hayes et al. |
| 2015/0356005 A1 | 12/2015 | Hayes et al. |
| 2016/0011816 A1 | 1/2016 | Aizman |
| 2016/0034295 A1 | 2/2016 | Cochran |
| 2016/0041868 A1 | 2/2016 | Davis et al. |
| 2016/0041869 A1 | 2/2016 | Davis et al. |
| 2016/0041878 A1 | 2/2016 | Davis et al. |
| 2016/0041887 A1 | 2/2016 | Davis et al. |
| 2016/0048399 A1 | 2/2016 | Shaw |
| 2016/0062623 A1 | 3/2016 | Howard et al. |
| 2016/0077925 A1* | 3/2016 | Tekade ............... G06F 11/1461 707/654 |
| 2016/0085797 A1 | 3/2016 | Patiejunas et al. |
| 2016/0092248 A1 | 3/2016 | Shani et al. |
| 2016/0179824 A1 | 6/2016 | Donlan et al. |
| 2016/0203477 A1 | 7/2016 | Yang et al. |
| 2016/0216991 A1 | 7/2016 | Ansari et al. |
| 2016/0283941 A1 | 9/2016 | Andrade |
| 2016/0335310 A1 | 11/2016 | Lahiri et al. |
| 2017/0024281 A1 | 1/2017 | Franklin et al. |
| 2017/0060687 A1 | 3/2017 | Franklin et al. |
| 2017/0123728 A1 | 5/2017 | Rungta |
| 2017/0180346 A1 | 6/2017 | Suarez et al. |
| 2017/0222814 A1 | 8/2017 | Oberhauser et al. |
| 2017/0235848 A1 | 8/2017 | Van Dusen et al. |
| 2017/0250801 A1 | 8/2017 | Chen et al. |
| 2017/0262697 A1 | 9/2017 | Kaps et al. |
| 2017/0293669 A1 | 10/2017 | Madhavan et al. |
| 2017/0295023 A1 | 10/2017 | Madhavan et al. |
| 2017/0331896 A1 | 11/2017 | Holloway et al. |
| 2018/0077250 A1* | 3/2018 | Prasad ................. H04L 67/22 |
| 2018/0082256 A1 | 3/2018 | Tummuru et al. |
| 2018/0329921 A1* | 11/2018 | Xue .................... G06F 3/0608 |

FOREIGN PATENT DOCUMENTS

| | | |
|---|---|---|
| JP | 2016081134 A | 5/2016 |
| KR | 20130107383 A | 10/2013 |
| WO | 02071382 A1 | 9/2002 |
| WO | 2014047073 A1 | 3/2014 |
| WO | 2016067295 A1 | 5/2016 |

OTHER PUBLICATIONS

Barr, "AWS Import/Export: Ship Us That Disk!," Amazon Web Services Blog, May 21, 2009, retrieved Mar. 14, 2017, https://aws.amazon.com/blogs/aws/send-us-that-data/, 7 pages.

Dang, "Recommendation for Applications Using Approved Hash Algorithms," National Institute of Standards and Technology (NIST) Special Publication 800-107 Revision 1, Aug. 2010, retrieved Nov. 24, 2015, http://csrc.nist.gov/publications/nistpubs/800-107-rev1/sp800-107-rev1.pdf, 25 pages.

International Search Report and Written Opinion dated Aug. 25, 2016, International Patent Application No. PCT/US2016/040510, filed Jun. 30, 2016.

Storer et al., "POTSHARDS—A Secure, Recoverable, Long-Term Archival Storage System," ACM Transactions on Storage, Published Jun. 2009, vol. 5, No. 2, Article 5, pp. 5:1 to 5:35.

Zyga, "Light-up Cereal Boxes Powered by Shelvers on Display at CES," Phys.org, Jan. 11, 2011, retrieved May 19, 2015, http://phys.org/news/201101lightupcerealpoweredshelvesces.html, 13 pages.

Japanese Office Action dated Mar. 5, 2019, Patent Application No. 2017-566702, filed Mar. 22, 2017, 8 pages.

Australian Examination Report No. 1 dated Feb. 3, 2020, Patent Application No. 2017336924, filed Sep. 29, 2017, 4 pages.

Japanese Decision to Grant a Patent dated Jun. 2, 2020, Patent Application No. 2019-516608, 1 page.

Japanese Notice of Reasons for Rejection dated Feb. 18, 2020, Patent Application No. 2019-516608, filed Sep. 29, 2017, 3 pages.

Singaporean Written Opinion dated May 14, 2020, Patent Application No. 11201902518S, 7 pages.

Australian Examination report No. 2 for Standard Patent Application dated Sep. 4, 2020, Patent Application No. 2017336924, 3 pages.

Australian Notice of Acceptance for Patent Application dated Oct. 28, 2020, Patent Application No. 2017336924, 3 pages.

"New! xTablet T7000 Rugged Mini Tablet PC," MobileDemand, copyright 2012 [web archive Mar. 12, 2012], https://web.archive.org/web/20120312010139/http://www.ruggedtabletpc.com/products/xtablet-t7000-rugged-mini-tablet-pc/, 3 pages.

Binns, "Elasticsearch Failure and Recovery," TechRabbit, Oct. 31, 2014 [retrieved Nov. 17, 2017], http://tech.taskrabbit.com/blog/2014/10/31/es-failure-recovery/, four pages.

European Office Action dated Nov. 6, 2018, Patent Application No. 16739357.8-1222, published May 9, 2018, 7 pages.

Franco, "Understanding Bitcoin: Cryptography, Engineering and Economics," Wiley, Nov. 24, 2014, 167 pages.

He et al., "Elastic Application Container: A Lightweight Approach for Cloud Resource Provisioning," 26th IEEE International Conference on Advanced Information Networking and Applications, Mar. 26, 2012, pp. 15-22.

IEEE 100, "The Authoritative Dictionary of IEEE Standards Terms", Seventh Edition, IEEE Standards Information Network, IEEE Press, Dec. 2000, 5 pages (pertinent pp. 1, 2, 155, 207, 1112).

International Organization for Standardization/ International Electrotechnical Commission, "Information technology—Trusted Platform Module—Part 1: Overview," International Standard, ISO/IEC 11889-1(E), May 15, 2009, 20 pages.

International Organization for Standardization/International Electrotechnical Commission, "Information technology—Trusted Platform Module—Part 2: Design principles," International Standard, ISO/IEC 11889-2(E), May 15, 2009, 152 pages.

(56) References Cited

OTHER PUBLICATIONS

International Organization for Standardization/International Electrotechnical Commission, "Information technology—Trusted Platform Module—Part 3: Structures," International Standard, ISO/IEC 11889-3:2009(E), May 15, 2009, 204 pages.
International Organization for Standardization/International Electrotechnical Commission, "Information technology—Trusted Platform Module—Part 4: Commands," International Standard, ISO/IEC 11889-4:2009(E), May 15, 2009, 254 pages.
International Search Report and Written Opinion in International Patent Application No. PCT/US2015/050513, dated Feb. 16, 2016, 22 pages.
International Search Report and Written Opinion dated Feb. 4, 2016, International Patent Application No. PCT/US2015/059983, 12 pages.
International Search Report and Written Opinion dated Nov. 22, 2017, International Patent Application No. PCT/US2017/054319, filed Sep. 29, 2017, 14 pages.
Kim, "How Sharding Works," Medium, Dec. 5, 2014 [retrieved Nov. 17, 2017], https://medium.com/@jeeyoungk/how-sharding-works-b4dec46b3f6, 12 pages.
MacCarthaigh, "Shuffle Sharding: Massive and Magical Fault Isolation," AWS Architecture Blog, Apr. 14, 2014 [retrieved Nov. 27, 2017], https://aws.amazon.com/blogs/architecture/shuffle-sharding-massive-and-magical-fault-isolation/, six pages.
PC Plus, "How to turn an old netbook into a NAS drive," TechRadar, Mar. 1, 2010 [retreived Feb. 5, 2019], https://www.techradar.com/news/networking/routers-storage/how-to-turn-an-old-netbook-into-a-nas-drive-670757, 12 pages.
Pikkarainen et al., "The impact of agile practices on communication in software development," Empirical Software Engineering 13(3):303-37, Jun. 1, 2008.
Ramamritham, "Allocation and scheduling of precedence-related periodic tasks," IEEE Transactions on Parallel and Distributed Systems 6(4):412-420, Apr. 1995.
Soltesz et al., "Container-based operating system virtualization: a scalable, high-performance alternative to hypervisors," ACM SIGOPS Operating Systems Review 41(3):275-287, Mar. 2007.
Swan, "Blockchain: Blueprint for a New Economy," O'Reilly Media, Inc., Jan. 22, 2015, 144 pages.
Thiele et al., "Embedded Software in Network Processors—Models and Algorithms," Lecture Notes in Computer Science 2211:416-34, Oct. 8, 2001.
Third-Party Submission Under 37 CFR 1.290 dated Apr. 24, 2018, U.S. Appl. No. 15/283,017, filed Sep. 30, 2016, 10 pages.
Trusted Computing Group, "TPM Main, Part 1 Design Principles," Specification Version 1.2, Level 2 Revision 103, Jul. 9, 2007, 182 pages.
Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 1.2, Level 2 Revision 103, Jul. 9, 2007, 198 pages.
Trusted Computing Group, "TPM Main, Part 2 TPM Structures," Specification Version 1.2, Revision 116, Mar. 1, 2011, 201 pages.
Trusted Computing Group, "TPM Main, Part 3 Commands," Specification Version 1.2, Level 2 Revision 103, Jul. 9, 2007, 330 pages.
Trusted Computing Group, "TPM Main, Part 3 Commands," Specification Version 1.2, Revision 116, Mar. 1, 2011, 339 pages.
Van et al., "SLA-aware Virtual Resource Management for Cloud Infrastructures," IEEE Ninth International Conference on Computer and Information Technology, Oct. 11, 2009, pp. 357-362.
Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.
Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.
Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.
Xavier et al., "Performance Evaluation of Container-based Virtualization for High Performance Computing Environments," Parallel, Distributed, and Network-Based Processing (PDP), 2013 21st Euromicro International Conference, Feb. 2013, pp. 233-240.
Zhao et al., "Experimental Study of Virtual Machine Migration in Support of Reservation of Cluster Resources," Proceedings of the 2nd International Workshop on Virtualization Technology in Distributed Computing, Nov. 2007, pp. 1-8.
Zheng et al., "Grid-partition index: a hybrid method for nearest-neighbor queries in wireless location-based services," The VLDB Journal—The International Journal on Very Large Data Bases 15(1):21-39, online publication Jul. 22, 2005, print publication Jan. 1, 2006.

* cited by examiner

MONOTONIC TIME-BASED DATA STORAGE

BACKGROUND

Modern computer systems make extensive use of network computing and network data storage systems. Such use has proliferated in recent years, particularly in distributed or virtualized computer systems where multiple computer systems may share resources when performing operations and tasks associated with the computer systems. Such computer systems frequently utilize distributed data storage in multiple locations to store shared data items so that such data items may be made available to a plurality of consumers. The resources for network computing and network data storage are often provided by computing resource providers who leverage large-scale networks of computers, servers, and storage drives to enable customers to host and execute a variety of applications and web services. The usage of network computing and network data storage allows customers to efficiently and to adaptively satisfy their varying computing needs, whereby the computing and data storage resources that may be required by the customers are added or removed from a large pool provided by a computing resource provider as needed.

The proliferation of network computing and network data storage, as well as the attendant increase in the number of entities dependent on network computing and network data storage, has increased the importance of efficiently tracking and indexing data stored and manipulated thereon. Furthermore, as systems scale to meet demand, they tend to become more widely distributed, and coordinating the various components of widely distributed systems becomes increasingly onerous, especially regarding processing of large numbers of data items (e.g., archives) to be encrypted, compressed, replicated, and/or otherwise stored.

BRIEF DESCRIPTION OF THE DRAWINGS

Various techniques will be described with reference to the drawings, in which.

DETAILED DESCRIPTION

Figure 1:
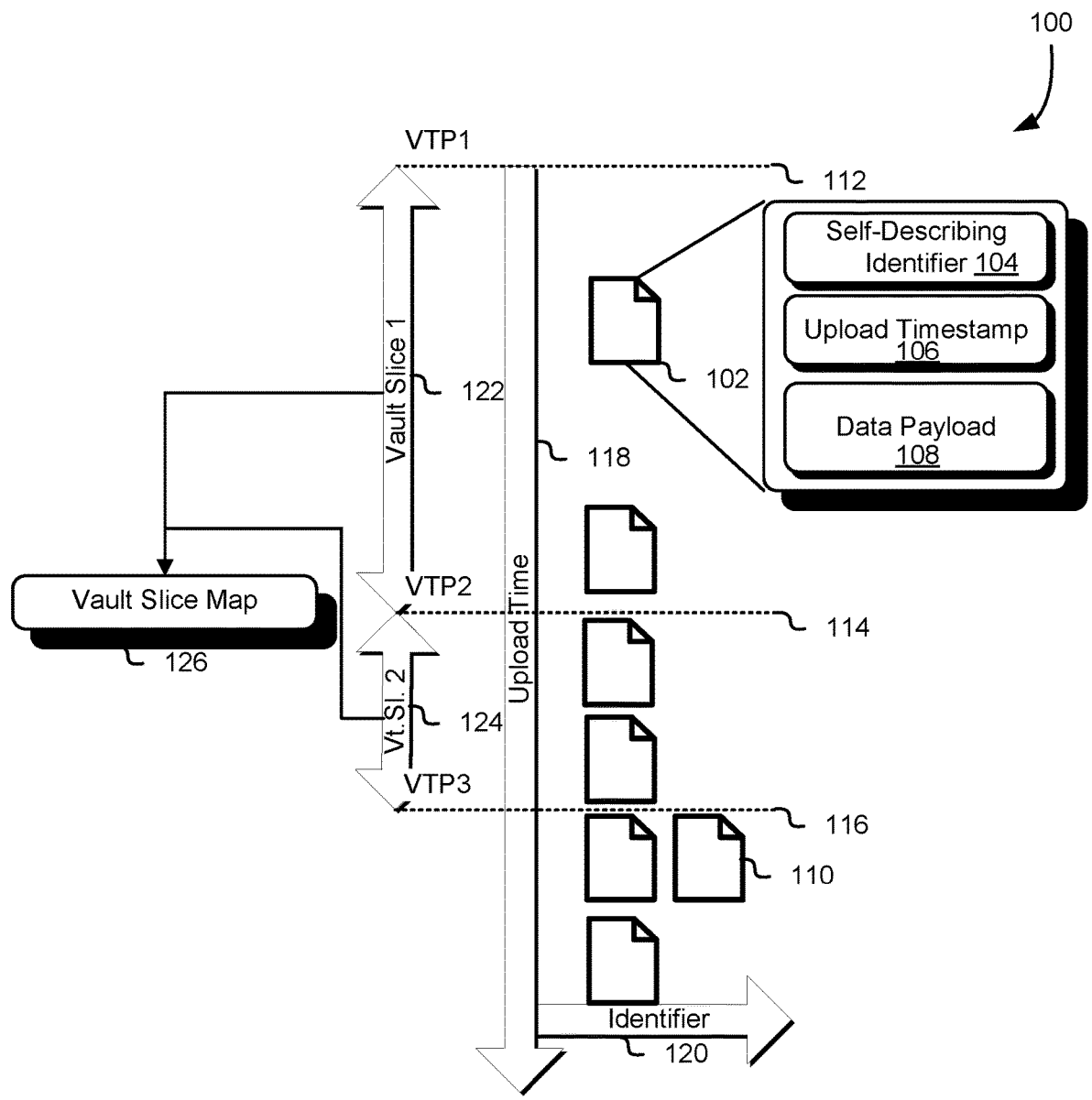
FIG. 1 illustrates an example in which archives or other data having associated self-describing identifiers is sorted and stored according to one or more parameters, and the express continuity of the sorting is used to generate one or more vault slices and indexed in a vault slice map, in accordance with some embodiments.

In one example, a data storage vault, which in some embodiments includes a plurality of data storage devices, is implemented such that data is written sequentially to the addressable storage of the overall vault in order of a monotonically advancing parameter associated with the data. One example of such a parameter is an upload time for a given portion of data to be written (such as customer-generated and/or customer-provided archives intended to be written to durable storage associated with a data storage system). To the extent that two portions of data (e.g., archives) share the same parameter value (e.g., even for a monotonic function, two subsequent inputs may result in the same value, such as would be the case if two archives were uploaded at precisely the same time, as would be possible in a distributed system), one or more other parameters, such as the unique identifiers associated with the archives themselves, can be used as a secondary (or tertiary, etc.) sort.

In some embodiments, the archives are of arbitrary sizes (in, e.g., bytes), as they may be generated by a plurality of customers of the data storage system/computing resource service provider. As data storage devices, such as tape media, may be of generally uniform size, and/or a partitioning scheme used by such devices may involve images of a specified size, the sort order of the archives may be used to generate a map of different "slices" of the overall addressable space represented by the vault as a whole. Such "slices" may correspond in size to the desired size of the images (which, in turn, may be specified in connection with the data storage devices on which they will eventually be stored).

The "slices" are defined by time points, along the address space as denominated by, e.g., the upload time of the archives comprising the data to be stored, where a given first time point denotes the start of the slice (inclusive of the specific byte defined in the time point) and a second time point denotes the end of the slice (exclusive of the specific byte correlated with that time point). As it is possible that a given time point may, for a given slice or image size, not necessarily line up with the start or the end of a given archive, but instead fall on a byte somewhere within the archive, to access a given byte in the system, both a time point (or associated slice) as well as the specific offset (either relative to the slice or to an identified archive within the slice) may be used.

A slice map associates the slices (which are, as previously mentioned, defined by the time points) with specific images via their respective identifiers. In some embodiments, the archives have self-describing identifiers, which include an upload timestamp, an identifier or index value, a size (e.g., in bytes) of the archive, and the like. Accordingly, a system implementing the techniques described herein may only need the self-describing identifier to efficiently locate the specific requested archive, without necessitating the indexing of each individual archive.

For example, a customer entity or device may request a specific archive previously stored using the techniques described. The request includes the self-describing identifier, and thus, the system derives the upload time, the unique archive identifier, and the byte size of the archive. The upload time is correlated with a time point within the vault, which may then be matched with a slice in the vault slice map, which in turn is correlated with a specific image. The image is retrieved, and, in the case where the image is associated with its own internal index, a single seek to the location of the archive is made, and a byte length correlated with the byte size of the requested archive is read from the start of the location associated with the archive.

As may be contemplated, the processing of the archives may be greatly enhanced, from an efficiency standpoint, by utilizing distributed computing techniques to parallelize the processing using a plurality of workers (e.g., resources of the implementing computing resource service provider capable of performing the processing tasks). However, as the indexing functionality described herein relies not only on the monotonicity of the underlying parameter(s), the order in which each portion of a given vault address space is accordingly demarcated must be preserved. Additionally, in some embodiments, the time points are established at known intervals (e.g., according to an associated fixed image size).

As such, parallelized processing must be carefully orchestrated to preserve the invariant order, as well as the continuity, of the archives/vault portions being processed. Accordingly, an implementing system may include a work item generator and a parallelized archive processor that track and process smaller portions of the data in the archives in the same or similar monotonically underpinned fashion as the data in the larger vault. For example, a work item generator may break a plurality of archives into processible chunks or work items, each work item having a consistent size that may, e.g., be tunable based to the particular characteristics of the archive processor. The work item generator may generate a sort order for the archives represented in the work items, in a similar way as the overall vault contents are sorted, and the sort order may be preserved in a work item table. The work items are placed in a queue for the archive processor, which may include a plurality of workers, each of which may take any work item and process the underlying data (e.g., prepare for storage by compressing and/or encrypting) in any order. The completed work items are held until an image assembler determines that a sufficient amount of contiguous work items have been processed to generate an image of the determined size. As described, such a determination may be made in the context of the generation of contiguous vault slices, while a given worker may continue to work to process work items as the archives continue to arrive.

As may be contemplated, archives may arrive at unpredictable times and in bursty quantities. Additionally, a distributed system having a plurality of workers may require a mechanism by which to avoid having a given worker process the same work item already being processed by another worker, as well as to avoid having different portions of the distributed system unsuspectingly process work items (and thus archives) along different and competing paradigms.

As described herein, tables (such as vault slice tables and work item tables) may track specific time points in a predictable way, e.g., by having a system-wide, published, known paradigm for where the specific time points will be (e.g., based on presumptions or predetermination of the slice characteristics they define). Furthermore, the system may define the slices such that the initial/start time point is inclusive of the byte it represents, while the final/end time point of a given slice is exclusive of the byte it represents (e.g., the time point is one byte after the last byte in the slice). Accordingly, if a time point entry exists in the table, a worker may assume that the work items and/or archives within the slice for which that time point is an initial time point are already being assembled, processed, etc.

Furthermore, special, predetermined markers may be used by various components of the system to signal that a given work item or archive has already been consumed or processed. For example, as archives and work items are progressively being added to a given slice/image as they are being processed, a given worker may update a table to indicate, e.g., the last offset processed for a given archive within the endpoint time point that defines the state of a given slice. However, in situations where an archive is added to a given slice, since the tables use an end time point that is not inclusive of the byte associated with that time point, an off-range counter or other signal (e.g., any value or variable type that is distinguishable from the byte range of a given archive) may be used to signify that the archive has been completely consumed within the associated slice.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example 100 in which archives or other data having associated self-describing identifiers is sorted and stored according to one or more parameters, and the express continuity of the sorting is used to generate one or more vault slices and indexed in a vault slice map, in accordance with some embodiments.

As mentioned, a data storage vault, which in some embodiments includes a plurality of data storage devices, is implemented such that data is written sequentially to the addressable storage of the overall vault in order of a monotonically advancing parameter associated with the data. For example, the monotonically advancing parameter is an upload time for a given portion of data to be written (such as customer-generated and/or customer-provided archives 102 intended to be written to durable storage associated with a data storage system). In some embodiments, the archives 102 are of arbitrary sizes (in, e.g., bytes). Archives may be generated by a plurality of customers of the data storage system/computing resource service provider, and provided to the data storage system, and may include any type of data, whether raw or packaged in a format designated by either the customer and/or the data storage system. The archives may be received as a result of the interaction between the customer device and an application programming interface (API) or web service provided by the computing resource service provider (e.g., on behalf of, or directly by, the data storage system).

The archive itself may include, either as calculated and added by the customer device or as a part of the ingestion process of the computing resource service provider and/or data storage system thereof, a self-describing identifier 104, an upload timestamp 106, and an encapsulated data payload 108. The self-describing identifier 104 may, for example, be an encrypted version (or an output of a hash function) of metadata associated with the archive. Such information may include an index or other identifier assigned to the archive by the data storage system (which itself may assigned in a monotonically increasing order), a size (e.g., byte length) of the data payload and/or the entire archive, and the like. Furthermore, the self-describing identifier 104 may include the upload timestamp 106.

The upload timestamp 106, in an embodiment, is the time at which the data storage system receives the archive from a customer device, such as via the API or web service call as previously mentioned. Alternatively, the upload timestamp 106 may be the time at which the customer device transmits the archive to the data storage system.

The parameter used for the primary sort, in an embodiment, is the upload timestamp 106. In the illustrated example, as the upload time 118 inherently moves forward (an inherent quality of time), it may be considered monotonically advancing and used as the primary sort order. To the extent that two or more archives share the same parameter value 110 (e.g., even for a monotonic function, two subsequent inputs may result in the same value, such as would be the case if two archives were uploaded at precisely the same time, as would be possible in a distributed system), one or more other parameters, such as the unique identifiers 120 associated with the archives themselves, can be used as a secondary sort. While only a primary and a secondary sort art described herein, additional sorts are contemplated herein.

As mentioned, the archives may be of arbitrary sizes (in, e.g., bytes). However, a system may, for the purposes of addressing a specific portion of data and to minimize the size of the index, choose to view all archives destined for a given vault as simply bytes, arranged, on an archive-by-archive basis, in order of the sort(s) just described. As such, locations within the vault's address space may be conceptualized as time points, rather than byte offsets. For example, a given byte offset difference may have a corresponding time point difference. If a vault includes an archive A has size 100 and archive B has size 200, and archive A was uploaded at time 1.0 and archive B was uploaded at time 2.0, a time point that splits the overall vault address space of 300 into equal parts of 150 could be denoted as 2.0:[identifier for archive B]:offset 50 (from the start of archive B). As another example, time points that split the vault into four parts may be as follows:

| Time point ID | Time point location |
|---|---|
| VTP1 | Epoch (zero) |
| VTP2 | 1.0:A:75 |
| VTP3 | 2.0:B:50 |
| VTP4 | 2.0:B:125 |
| VTP5 | 2.0:B:200 |

Furthermore, a given archive may span two or more vaults. In some embodiments, a vault identifier may be added to the time point location description. Given the above, a vault slice map may be generated to describe "slices," or portions of data in the vault, in terms of two bounding time points. For example, a vault slice map 126 may include the triple (or quadruple) for each time point that defines that slice (e.g., vault slice 1 122 is defined by epoch VTP1 112 and VTP2, while vault slice 124 is defined by VTP2 114 and VTP3 116). The "slices," by virtue of being defined in terms of time (and time points), are thus arranged in order of upload time, and are continuous as an addressable space, without byte gaps in between.

As data storage devices, such as tape media, may be of generally uniform size, and/or a partitioning scheme used by such devices may involve images of a specified size, in some embodiments, the slices are of a consistent size that corresponds to the desired size of the images (which, in turn, may be specified in connection with the data storage devices on which they will eventually be stored). The vault slice map 126 associates the slices with specific images via their respective identifiers.

Figure 2:
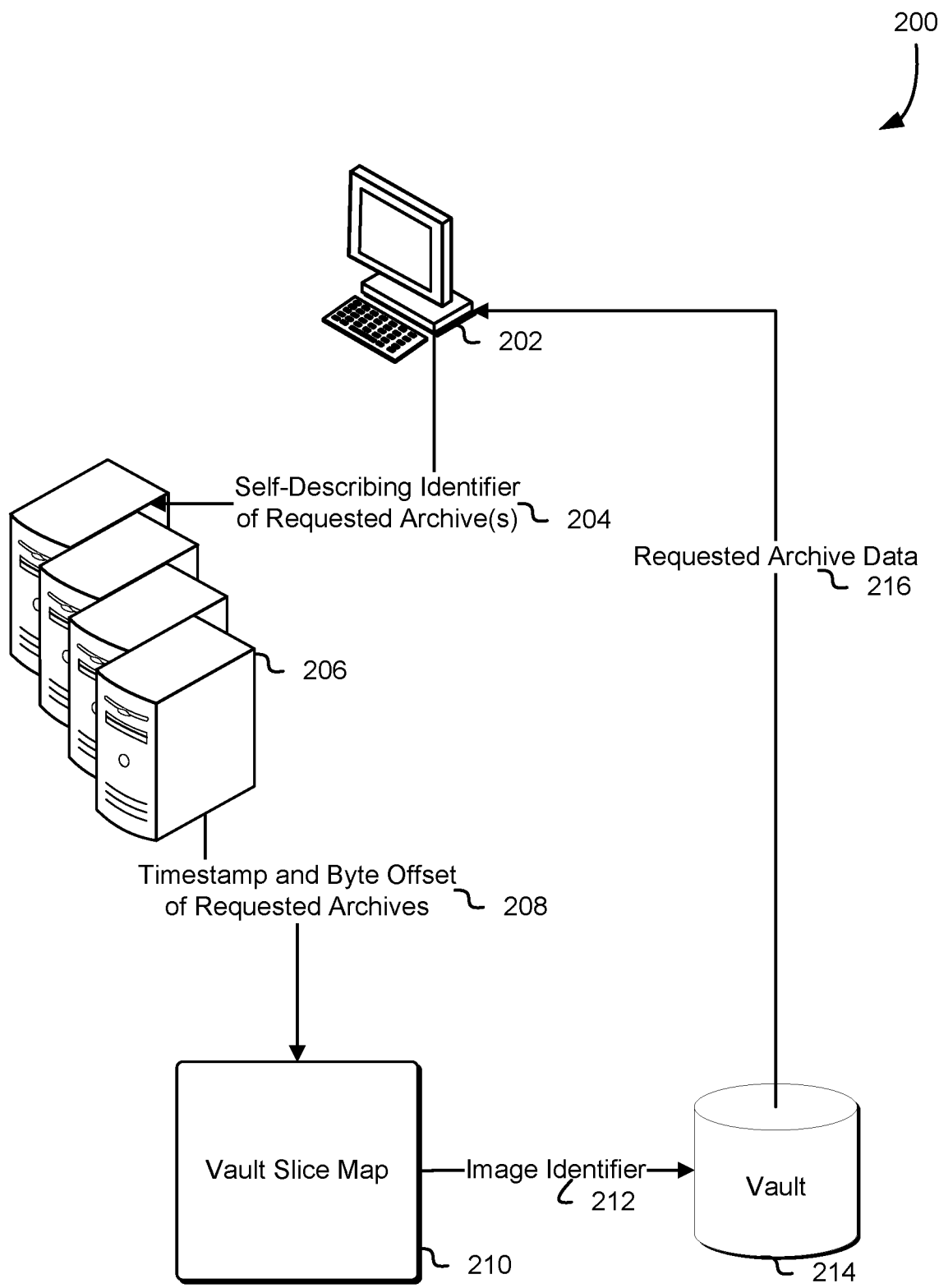
FIG. 2 illustrates an example in which an entity requests one or more archives stored in a monotonic time-based archival storage system, and the request is processed using at least a vault slice map, in accordance with some embodiments.

FIG. 2 illustrates an example 200 in which an entity requests one or more archives stored in a monotonic time-based archival storage system, and the request is processed using at least a vault slice map, in accordance with some embodiments.

As previously mentioned, in some embodiments, the archives have self-describing identifiers, which include an upload timestamp, an identifier or index value, a size (e.g., in bytes) of the archive, and, in some cases, other metadata associated with the vault, the archive, the data storage system, etc. Accordingly, a system implementing the techniques described herein, e.g., in FIG. 1 above, may only need the self-describing identifier to efficiently locate the specific requested archive, without needing to index each individual archive in a central index.

For example, a customer entity or device 202 may request a specific archive previously stored using the techniques described. The request includes the self-describing identifier 204, and thus, the data storage system 206 derives the upload time, the unique archive identifier, the byte size of the archive, etc. Alternatively, the customer entity, as part of request, processes the self-describing identifier 204 into the relevant components 208, and submits that metadata as part of the request.

Once derived or received, the upload time is correlated with a time point within the vault, which may then be matched with a slice in the vault slice map, which in turn is correlated with a specific image. For example, since the vault slice map 210 is continuous with respect to the bytes represented in the vault (e.g., of the archives), and is arranged in increasing order of upload time, a simple lookup within the vault slice map 210 to match, e.g., the key of the storing key-value store (where the key is the initial time point of each slice) with the relevant slice, is sufficient to locate the image. The vault slice map 210 correlates the slice with one or more images associated with the archive(s) via their respective image identifiers 212, and using the image identifiers 212, the image(s) are retrieved from one or more relevant data storage devices associated with the vault 214.

Furthermore, since the byte size of the archive is known, and, in some embodiments, the image itself has an internal index (e.g., that refer to the specific locations/offsets within the image of each archive contained within), the system may be capable of retrieving only the archive, or a byte range within that archive, instead of the entire image.

The retrieved data 216 is presented to the customer device (or other entity). For example, the retrieved data 216 may be placed in a staging storage for later retrieval by a customer device or entity.

Figure 3:
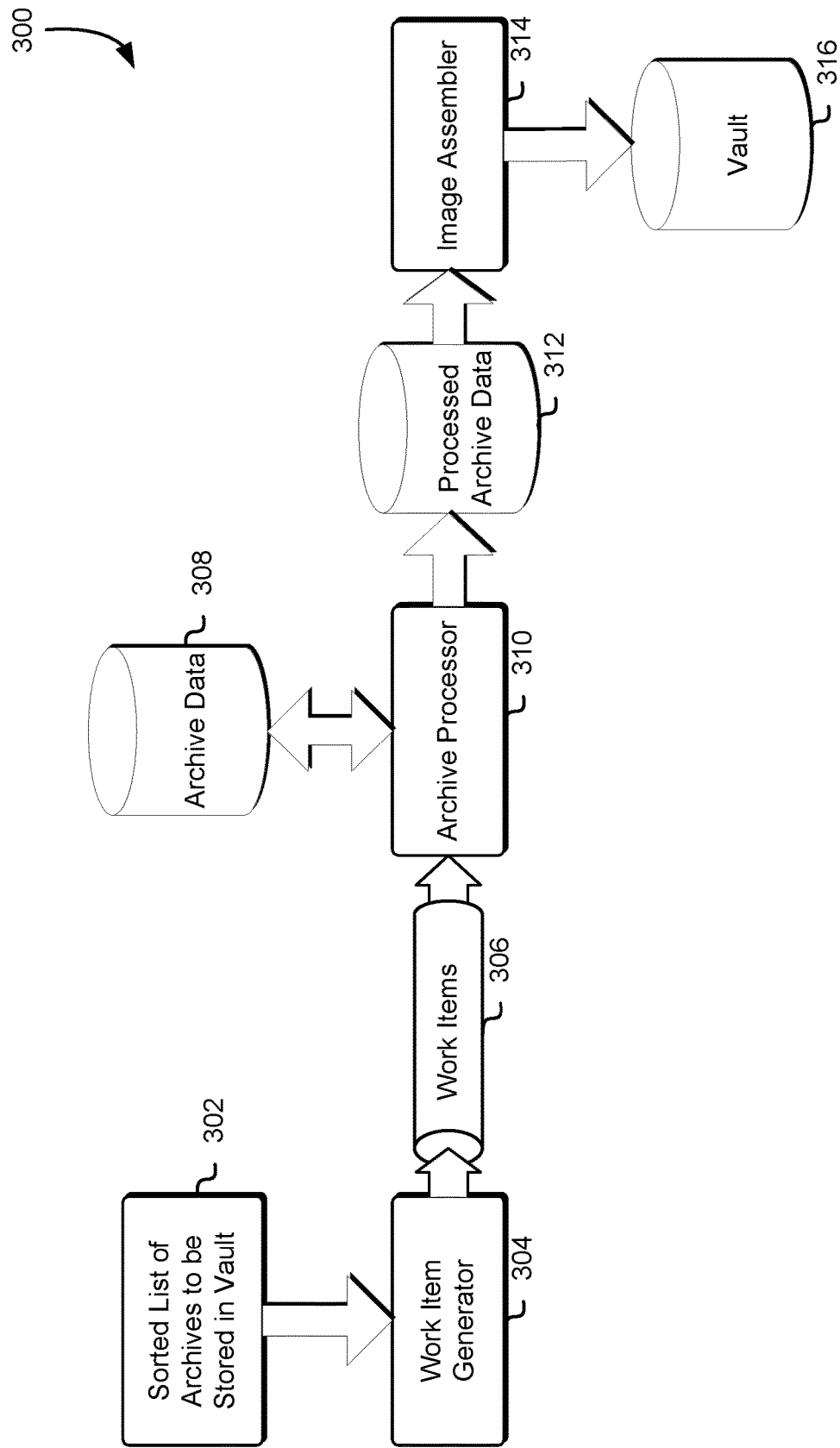
FIG. 3 illustrates an example environment that ingests and processes a plurality of archives to be sorted, indexed, and stored in accordance with one or more monotonically advancing parameters, in accordance with some embodiments.

FIG. 3 illustrates an example environment 300 that ingests and processes a plurality of archives to be sorted, indexed, and stored in accordance with one or more monotonically advancing parameters, in accordance with some embodiments.

As previously mentioned, the processing of the archives may be greatly enhanced, from an efficiency standpoint, by utilizing distributed computing techniques to parallelize the processing using a plurality of workers (e.g., resources of the implementing computing resource service provider capable of performing the processing tasks). However, as the indexing functionality described relies on the monotonicity of the underlying parameter(s), the order in which each portion of a given vault address space is accordingly demarcated must be preserved.

As such, parallelized processing must be carefully orchestrated to preserve the invariant order, as well as the continuity, of the archives/vault portions being processed. Accordingly, an implementing system may include a work item generator 304 and an archive processor 310 that track and process smaller portions of the data in the archives in the same or similar monotonically underpinned fashion as the data in the larger vault 316. Additionally, the system may implement an image assembler 314 to reorder the resultant work items into larger images to be written as previously described, where the images also retain the necessary sort order.

The work item generator 304, the archive processor 310, and the image assembler 314 may be implemented by a data storage system and/or a computing resource service provider using any computational resources of said system or provider. Additionally, one or more of the work item generator 304, the archive processor 310, and/or the image assembler 314 may be parallelized, e.g., have a plurality of workers, threads, or other computation entities, operating in a distributed and/or decentralized manner. For example, the computational resources used may include discrete entities, such as processors, memory, storage devices, and/or the like, virtualized abstractions thereof (such as virtual machines), or some combination thereof.

Similarly, data stores used to store work items (e.g., 308) or to hold processed archive data (e.g., 312), may be implemented as databases, key-value stores, services providing such services, physical data storage media, and the like. Furthermore, queued work items may be held in an implemented queue local to the implementing system, by a remote service providing, e.g., guaranteed-order queueing, and the like.

In the illustrated example, a work item generator 304 breaks a plurality of archives, such as a series of archives arranged and/or sorted by order of upload 302 into processible chunks or work items, each work item having a consistent size that may, e.g., be tunable based to the particular characteristics of the archive processor 310. The work item generator 304 may generate a sort order for the archives represented in the work items, in a similar way as the overall vault contents are sorted, and the sort order may be preserved in, e.g., a work item table (which, similarly to a vault slice table, may be implemented in a key-value store).

The work items are placed in a queue 306 for the archive processor 310, which may include a plurality of workers as previously mentioned. In parallelized/distributed implementations, any available worker of the archive processor may take any work item and process the underlying data (e.g., prepare for storage by compressing and/or encrypting) in any order. The completed work items are held, e.g., in a staging data store 312, until an image assembler 314 determines that a sufficient quantity of temporally and byte-contiguous work items have been processed to generate an image of the determined size.

Such a determination may be made in the context of the generation of contiguous vault slices, while a given worker may continue to work to process work items as the archives continue to arrive. As may be contemplated, archives may arrive at unpredictable times and in bursty quantities. Additionally, a distributed system having a plurality of workers may require a mechanism by which to avoid having a given worker process the same work item or archive already being processed by another worker, as well as to avoid having different portions of the distributed system unsuspectingly process work items (or archives or images) along different and competing paradigms.

Various data structures, such as vault slice tables and work item tables, may be implemented to track specific time points in a predictable way, e.g., by having a system-wide, published, known paradigm for where the specific time points will be (e.g., based on presumptions or predetermination of the slice characteristics they define). Furthermore, in some embodiments, the system may define the slices such that the initial/start time point is inclusive of the byte it represents, while the final/end time point of a given slice is exclusive of the byte it represents (e.g., the time point is one byte after the last byte in the slice), such as would be the case if the initial time point is used as the invariant key for each subsequent slice. In some of such implementations, if a time point entry exists in the table, a worker may assume that the work items and/or archives within the slice for which that time point is an initial time point are already being assembled, processed, etc., and may then move on to the next available set of work items, archives, images, etc.

Furthermore, special, predetermined markers may be used by various components of the system to signal that a given work item or archive has already been consumed or processed. For example, as archives and work items are progressively being added to a given slice/image as they are being processed, a given worker may update a table to indicate, e.g., the last offset processed for a given archive within the endpoint time point that defines the state of a given slice. However, in situations where an archive is added to a given slice, since the tables use an end time point that is not inclusive of the byte associated with that time point, an off-range counter or other signal (e.g., any value or variable type that is distinguishable from the byte range of a given archive) may be used to signify that the archive has been completely consumed within the associated slice.

Figure 4:
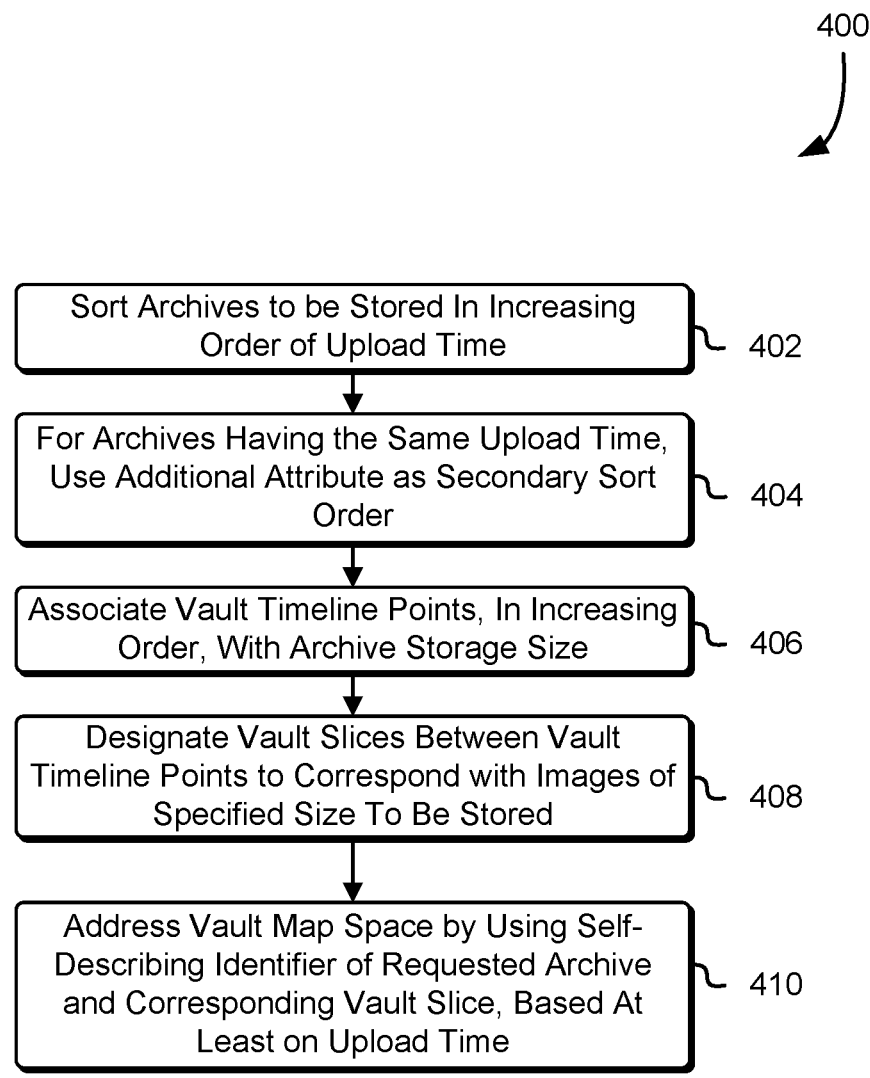
FIG. 4 illustrates an example process for using one or more sortable parameters having monotonicity, such as upload time, for generating an addressing scheme using timepoints and associated slices, in accordance with some embodiments.

FIG. 4 illustrates an example process 400 for using one or more sortable parameters having monotonicity, such as upload time, for generating an addressing scheme using timepoints and associated slices, in accordance with some embodiments.

At step 402, an entity, such as an entity of a data storage system, sorts incoming archives to be stored in progressive order of their respective upload time. In some embodiments, this may entail placing each archive in a queue based on its arrival or upload time, and periodically cataloging the contents of that queue.

At step 404, in scenarios where two or more incoming archives have the same upload time, a secondary sort may be performed to further refine the order of archive storage. As previously discussed, the secondary sort may use a different, unique identifier or index attributed to each of the archives.

At step 406, time points, as described at least in connection with FIGS. 1-3, are designated with respect to the sort order determined in connection with steps 402 and 404, as well as the desired size of the resultant slices. As previously mentioned, an initial time point may be an epoch time point that is not necessarily associated with any specific archive, and simply marks the start of the vault (e.g., prior to the first byte in the vault). Along similar lines, the initial time points for slices may be set as invariants in the system, e.g., as keys in the table, where each initial time point may be known ahead of time if the images/slices are of predetermined and equal length.

At step 408, as slices are delineated in step 406, associated images to be written are associated in step 408 with the slices, such as in a vault slice map as previously described, and at step 410, retrievals may be performed using the vault slice map generated in step 408, as well as the self-identifying identifier of the requested archive(s) as previously described.

Figure 5:
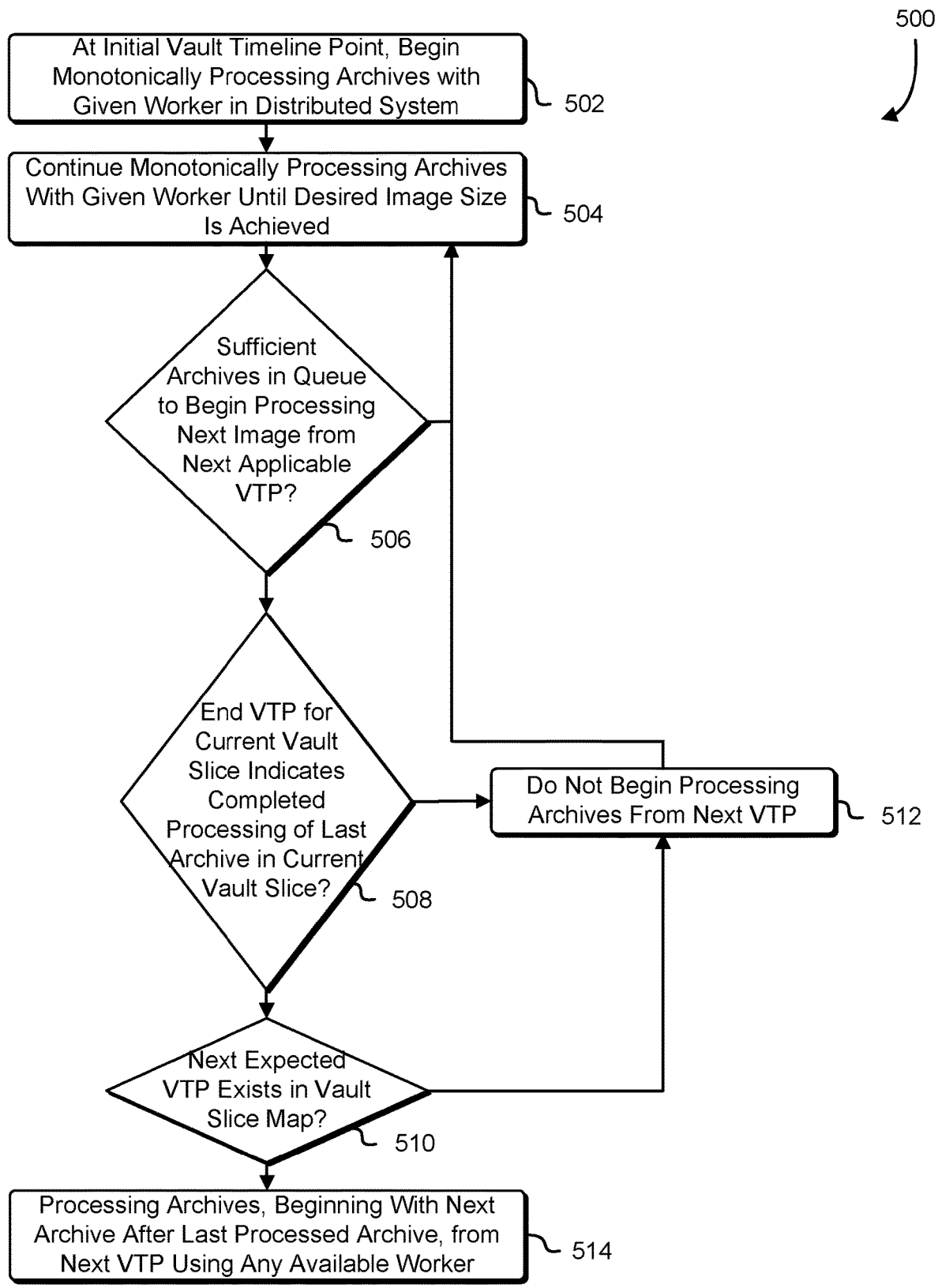
FIG. 5 illustrates an example process for ingesting and preparing a plurality of archives using a distributed system having a plurality of workers, in accordance with some embodiments.

FIG. 5 illustrates an example process 500 for ingesting and preparing a plurality of archives using a distributed system having a plurality of workers, in accordance with some embodiments.

At step 502, processing of a vault's contents begins at the first archive in a given queue, such as by using a work item generator and/or an archive processor as described above in connection with at least FIG. 3. At step 504, the archives are progressively consumed, and a work item table is built, which, as previously mentioned, may have similarly monotonic characteristics as the larger vault slice map. In systems involving distributed and parallelized workers, at decision point 506, if there are sufficient archives/work items in the queue to begin processing the following image (or any one after the present one being processed), at decision point 508, a determination is made as to whether a given archive has been partially or wholly consumed by the present image by the worker "picking up" the next image and/or work item. If insufficient archives exist in the queue for there to be a "next" image (at decision point 506), archives continue to be processed for the current image. Additionally, if a given archive has not been fully consumed (e.g., by the absence of a marker indicating the point at which the present worker has consumed or processed the archive), that archive is not processed or added to the next slice/image at step 512.

If, however, there are sufficient archives in the queue for a "new" slice," and a worker determines that the archive it is about to pick up for processing has not yet been processed or added to a previously slice, the inquiring worker at decision point 510 determines whether that "next" slice has already been created (e.g., in the vault slice map) by another worker. If so, that worker does not begin the processing. However, assuming that the next slice does not exist in the map (e.g., the initial time point has not yet been added as a key), the additional worker, at step 514, initiates processing of the next archive to be added to the next slice.

Figure 6:
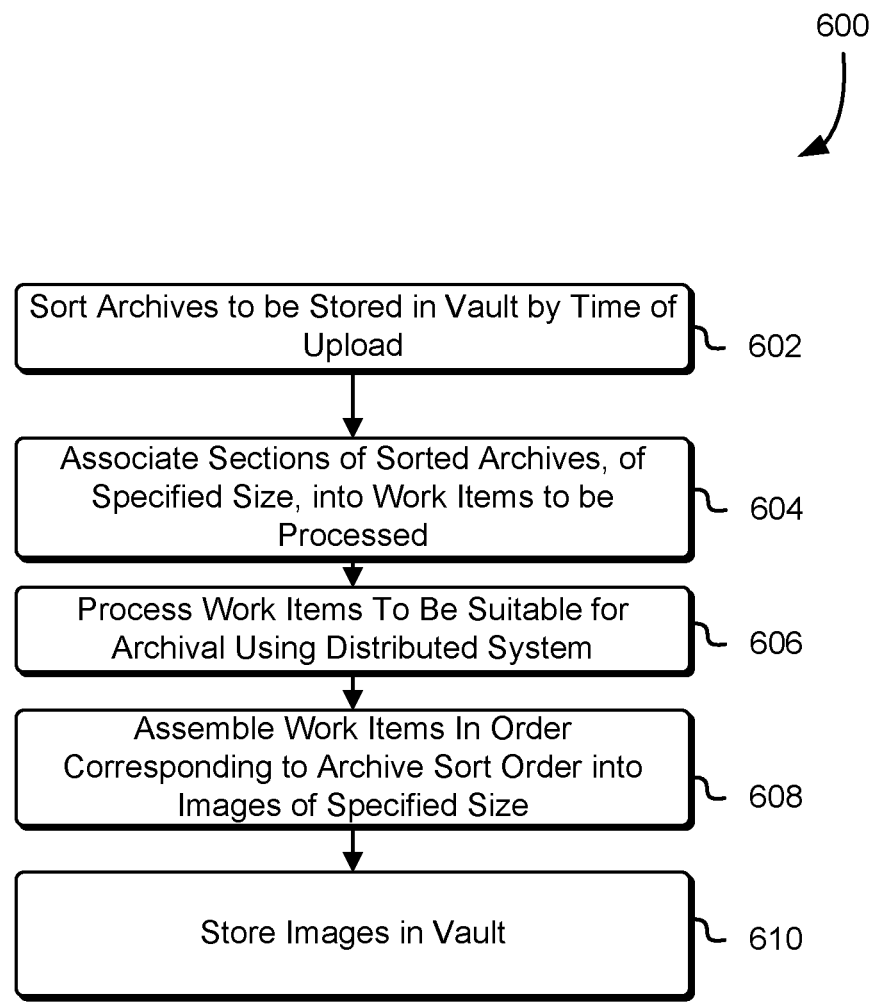
FIG. 6 illustrates an example process for generating work items and assembling writable images therefrom, in accordance with some embodiments.

FIG. 6 illustrates an example process 600 for generating work items and assembling writable images therefrom, in accordance with some embodiments.

At step 602, archives to be stored in a given vault are ingested, e.g., by request or importation, and sorted into a specified order relative to a monotonically increasing parameter, such as time of upload, and using previously described techniques. At step 604, portions of the overall load of archives are aggregated into work items of a specified size, generally smaller than that of the image as a whole, while retaining similar properties (e.g., continuity, monotonicity, invariancy at least of each initial time point) to the sorted vault contents as previously described (but on a smaller scale).

At step 606, the work items as generated in step 604 are processed for archival, e.g., using at least part of the process described in connection with FIG. 5 above, preparing, for storage, such as by compressing, encrypting, identifying, etc. the data within the archives/work items. As previously discussed, the work items may be consumed and processed in any order, as the sort order had previously been determined and stored for future reassembly.

At step 608, after a sufficient quantity of contiguous work items (according to the table generated in connection with step 602 and 604), an entity, such as an image reassembler as previously described, assembles the work items into the previously determined order to form one or more images, and at step 610, those images are stored in the designated vault.

Figure 7:
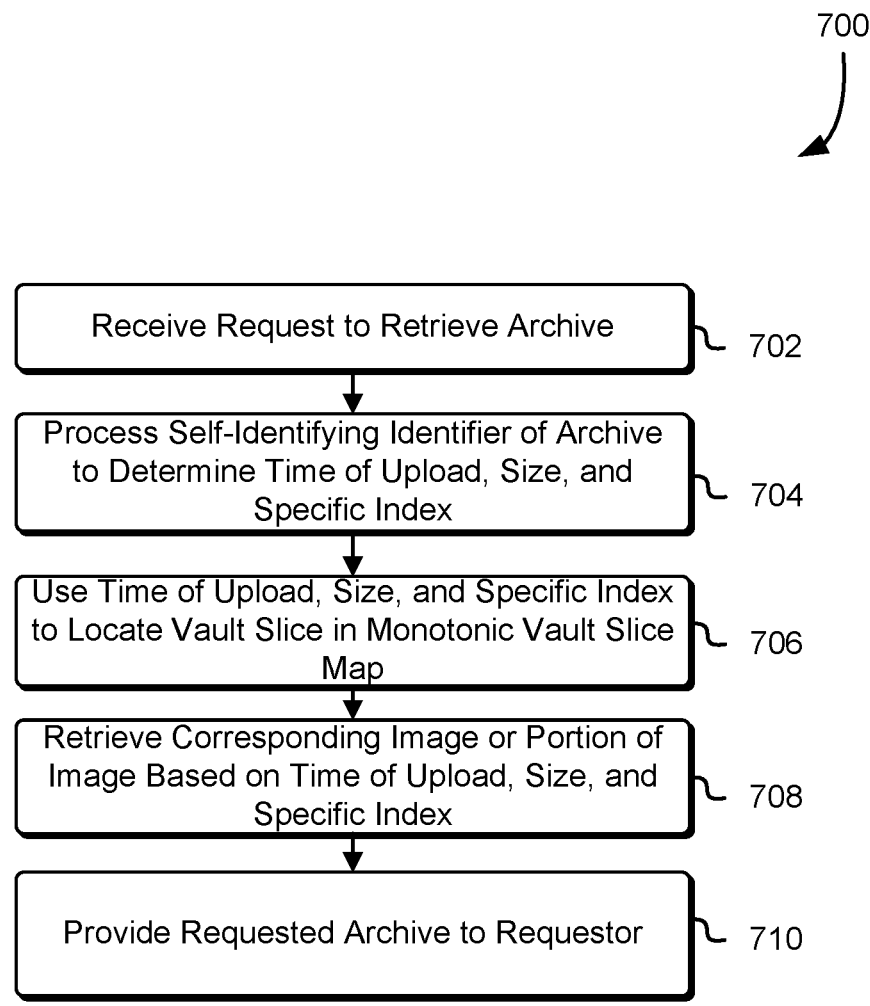
FIG. 7 illustrates an example process for retrieving an archive from a system that stores archives based on one or more monotonically advancing parameters, in accordance with some embodiments.

FIG. 7 illustrates an example process 700 for retrieving an archive from a system that stores archives based on one or more monotonically advancing parameters, in accordance with some embodiments.

At step 702, a request is received from, e.g., a customer entity, to retrieve a specified archive, which, as previously mentioned, may have a self-describing identifier. At step 704, that self-describing identifier is processed, e.g., by the data storage system, to determine the time of upload, size, and/or other unique identifier associated with the requested archive.

At step 706, the time of upload, size, and specific index is used to locate the associated vault slice/image, and specific location within, of the requested archive, and at step 708, the corresponding image with the mapped identifier is retrieved from the vault. The requested data is then located and provided to the requestor or another entity, e.g., by placement into a staging store for later retrieval.

Figure 8:
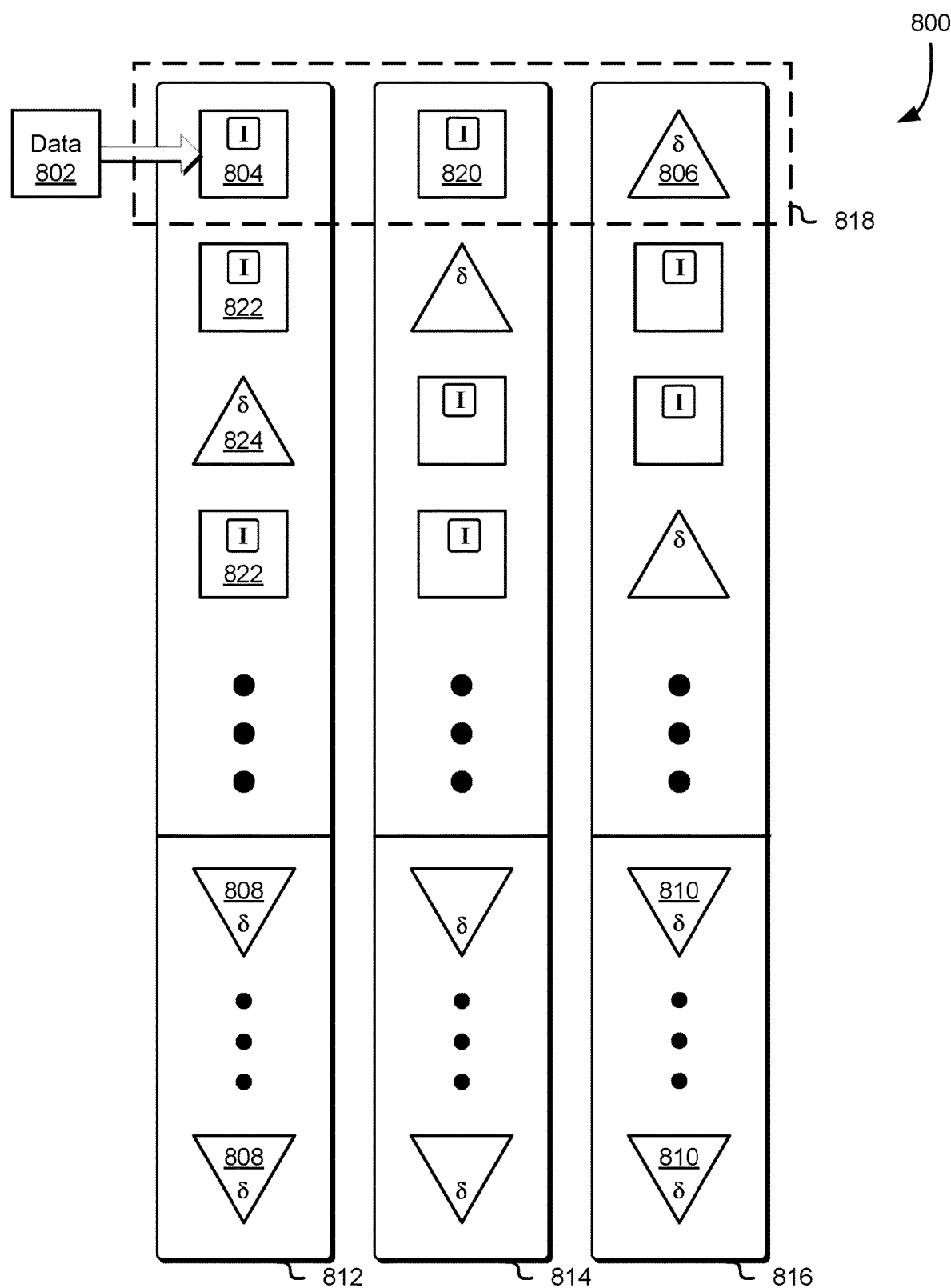
FIG. 8 illustrates an example environment where a redundancy encoding technique is applied to data stored in durable storage in accordance with at least one embodiment.

FIG. 8 illustrates an example environment 800 where a redundancy encoding technique is applied to data stored in durable storage as described and in accordance with an embodiment. The redundancy encoding technique illustrated in FIG. 8 is an example of a grid encoding technique wherein each identity shard is part of a first set of one or more identity shards which may be bundled with one or more derived shards in a first group or bundle (i.e., in one dimension or direction) and each identity shard is also part of at least a second set of one or more identity shards which may be bundled with one or more other derived shards in a second bundle or group (i.e., in a second dimension or direction). As is illustrated in FIG. 8, a grid encoding technique is often implemented as a two-dimensional grid, with each shard being part of two bundles (i.e., both "horizontal" and "vertical" bundles). However, a grid encoding technique may also be implemented as a three-dimensional grid, with each shard being part of three bundles, or a four-dimensional grid, with each shard being part of four bundles, or as a larger-dimensional grid. Additional details of grid encoding techniques are described in U.S. patent application Ser. No. 14/789,783, filed Jul. 1, 2015, entitled "GRID ENCODED DATA STORAGE SYSTEMS FOR EFFICIENT DATA REPAIR," which is incorporated by reference herein.

In the example illustrated in FIG. 8, data 802 from preliminary storage is provided for storage in durable storage using a redundancy encoding technique with both horizontal derived shards and vertical derived shards. In the example illustrated in FIG. 8, a first datacenter 812 may contain data shards (denoted as a square shard with the letter "I"), horizontal derived shards (denoted as a triangular shard with the Greek letter "δ" or delta), and vertical derived shards (denoted as an inverted triangle with the Greek letter "δ") all of which may be stored on durable storage volumes within the first datacenter 812. A second datacenter 814, which may be geographically and/or logically separate from the first datacenter 812, may also contain data shards, horizontal derived shards, and/or vertical derived shards. A third datacenter 816, which may be geographically and/or logically separate from the first datacenter 812 and from the second datacenter 814, may also contain data shards, horizontal derived shards, and/or vertical derived shards. As illustrated in FIG. 8, each of the three datacenters may be a single vertical bundle. In an embodiment, each of the datacenters can include multiple vertical bundles. As may be contemplated, the number of datacenters illustrated in FIG. 8 and/or the composition of the datacenters illustrated in FIG. 8 are merely illustrative examples and other numbers and/or compositions of datacenters may be considered as within the scope of the present disclosure. The datacenters may be co-located or may be located in one or more separate datacenter locations.

In the example illustrated in FIG. 8, the data 802 may be copied to a data shard 804 and, as a result of the change to the data in the data shard 804, a horizontal derived shard 806 associated with the data shard 804 may be updated so that the horizontal derived shard 806 may be used to reconstruct the data shard 804 in the event of a loss of the data shard 804. In the example illustrated in FIG. 8, the three shards enclosed by the dotted line (e.g., the data shard 804, the data shard 820, and the horizontal derived shard 806) are a horizontal bundle 818. In this example, the data shard 820 is not affected by the changes to the data shard 804 but the horizontal derived shard 806 may need to be updated as a result of the changes to the data shard 804.

Also as a result of the change to the data in the data shard 804, one or more vertical derived shards 808 related to the data shard 804 may also be updated so that the vertical derived shards 808 may be used to reconstruct the data shard 804 in the event of a loss of the data shard 804 and the horizontal derived shard 806. In the example illustrated in FIG. 8, the shards in datacenter 812 form a vertical bundle. In this example, the other data shards 822 in the vertical bundle and/or the horizontal derived shards 824 in the vertical bundle are not affected by the changes to the data shard 804 but the vertical derived shards 808 may need to be updated as a result of the changes to the data shard 804. Finally, as a result of the change to the horizontal derived shard 806, one or more vertical derived shards 810 related to the horizontal derived shard 806 in the vertical bundle in datacenter 816 may also be updated so that the vertical derived shards 810 may be used to reconstruct the horizontal derived shard 806 in the event of a loss of the horizontal derived shard 806 and the data shard 804.

Figure 9:
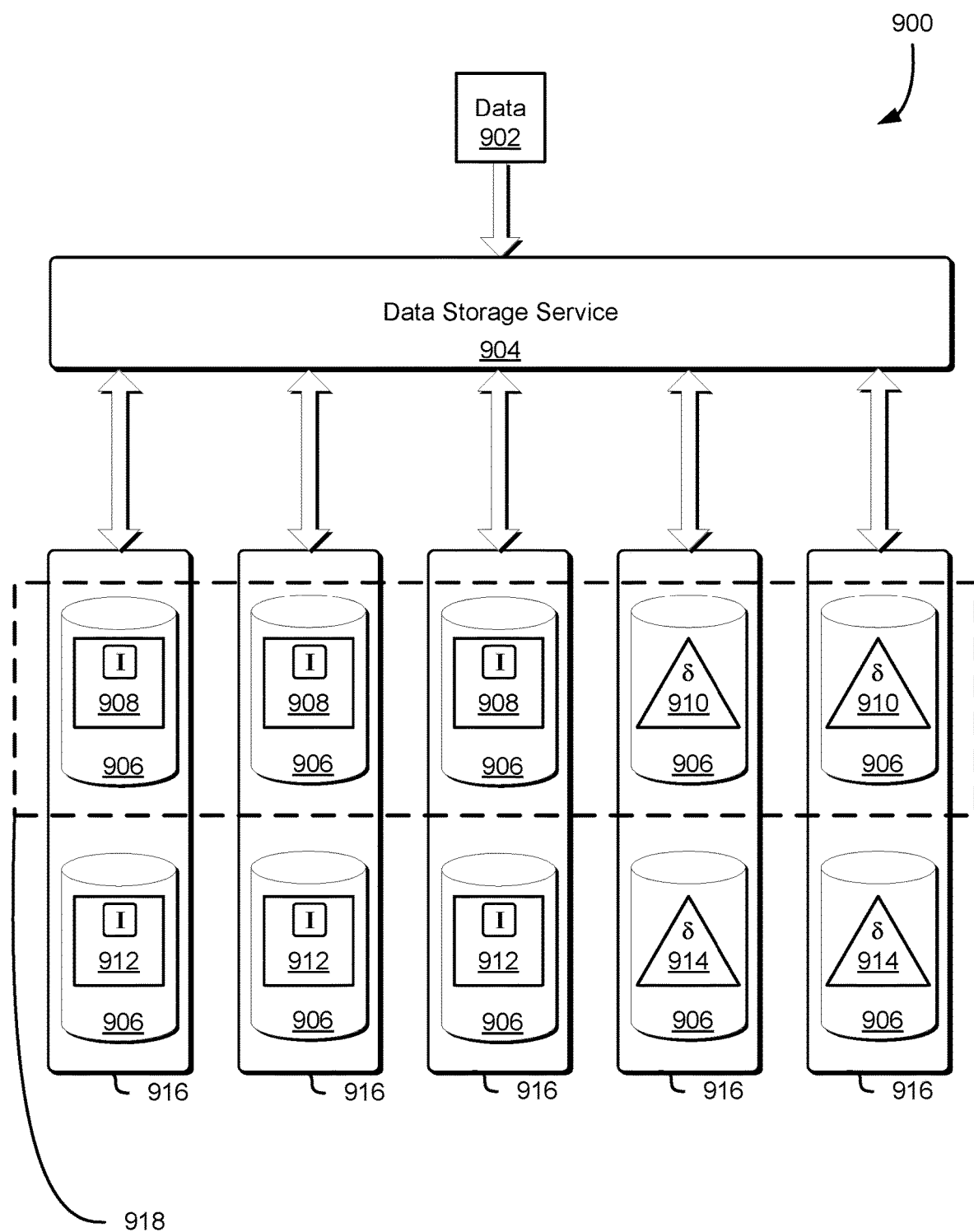
FIG. 9 illustrates an example environment where a redundancy encoding technique is applied to data stored in durable storage in accordance with at least one embodiment.

FIG. 9 illustrates an example environment 900 where a redundancy encoding technique is applied to data stored in durable storage and in accordance with at least one embodiment. The redundancy encoding technique illustrated in FIG. 9 is an example of a bundle encoding technique wherein one or more identity shards (also referred to herein as "data shards") may be bundled with one or more derived shards in a single group or dimension. Additional details of bundle encoding techniques are described in U.S. patent application Ser. No. 14/741,409, filed Jun. 16, 2015, entitled "ADAPTIVE DATA LOSS MITIGATION FOR REDUNDANCY CODING SYSTEMS," which is incorporated by reference herein.

Data 902 from preliminary storage may be sent to a data storage system 904 for redundant storage. The data 902 may be provided from the preliminary storage by any entity capable of transacting data with a data storage system, such as over a network (including the Internet). Examples include physical computing systems (e.g., servers, desktop computers, laptop computers, thin clients, and handheld devices, such as smartphones and tablets), virtual computing systems (e.g., as may be provided by the computing resource service provider using one or more resources associated therewith), services (e.g., such as those connecting to the data storage system 904 via application programming interface calls, web service calls, or other programmatic methods), and the like.

The data storage system 904 may be any computing resource or collection of such resources capable of processing data for storage, and interfacing with one or more resources to cause the storage of the processed data. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 904 via application programming interface calls, web service calls, or other programmatic methods), and the like. In some embodiments, the resources of the data storage system 904, as well as the data storage system 904 itself, may be one or more resources of a computing resource service provider, such as that described in further detail below. In some embodiments, the data storage system 904 and/or the computing resource service provider provides one or more archival storage services and/or data storage services, such as those described herein, through which a client entity may provide data such as the data 902 for storage in preliminary storage and/or the data storage system 904.

Data 902 may include any quantity of data in any format. For example, the data 902 may be a single file or may include several files. The data 902 may also be encrypted by, for example, a component of the data storage system 904 after the receipt of the data 902 in response to a request made by a customer of the data storage system 904 and/or by a customer of computing resource service provider.

The data storage system 904 may sort one or more identity shards according to one or more criteria (and in the case where a plurality of criteria is used for the sort, such criteria may be sorted against sequentially and in any order appropriate for the implementation). Such criteria may be attributes common to some or all of the archives, and may include the identity of the customer, the time of upload and/or receipt (by the data storage system 904), archive size, expected volume and/or shard boundaries relative to the boundaries of the archives (e.g., so as to minimize the number of archives breaking across shards and/or volumes), and the like. As mentioned, such sorting may be performed so as to minimize the number of volumes on which any given archive is stored. Such techniques may be used, for example, to optimize storage in embodiments where the overhead of retrieving data from multiple volumes is greater than the benefit of parallelizing the retrieval from the multiple volumes. Information regarding the sort order may be persisted, for example, by the data storage system 904, for use in techniques described in further detail herein.

As previously discussed, in some embodiments, one or more indices may be generated in connection with, for example, the order in which the archives are to be stored, as determined in connection with the sorting mentioned immediately above. The index may be a single index or may be a multipart index, and may be of any appropriate architecture and may be generated according to any appropriate method. For example, the index may be a bitmap index, dense index, sparse index, or a reverse index. Embodiments where multiple indices are used may implement different types of indices according to the properties of the identity shard to be stored via the data storage system 904. For example, a data storage system 904 may generate a dense index for archives over a specified size (as the size of the index itself may be small relative to the number of archives stored on a given volume), and may also generate a sparse index for archives under that specified size (as the ratio of index size to archive size increases).

The data storage system 904 is connected to or includes one or more volumes 906 on which archives or identity shards may be stored. The generated indices for the archives may also be stored on the one or more volumes 906. The volumes 906 may be any container, whether logical or physical, capable of storing or addressing data stored therein. In some embodiments, the volumes 906 may map on a one-to-one basis with the data storage devices on which they reside (and, in some embodiments, may actually be the data storage devices themselves). In some embodiments, the size and/or quantity of the volumes 906 may be independent of the capacity of the data storage devices on which they reside (e.g., a set of volumes may each be of a fixed size such that a second set of volumes may reside on the same data storage devices as the first set). The data storage devices may include any resource or collection of resources, such as those of a computing resource service provider, that are capable of storing data, and may be physical, virtual, or some combination of the two.

As previously described, one or more indices may, in some embodiments, be generated for each volume of the plurality of volumes 906, and in such embodiments, may reflect the archives stored on the respective volume to which it applies. In embodiments where sparse indices are used, a sparse index for a given volume may point to a subset of archives stored or to be stored on that volume, such as those archives which may be determined to be stored on the volume based on the sort techniques mentioned previously. The subset of volumes to be indexed in the sparse index may be selected on any appropriate basis and for any appropriate interval. For example, the sparse index may identify the archives to be located at every x blocks or bytes of the volume (e.g., independently of the boundaries and/or quantity of the archives themselves). As another example, the sparse index may identify every nth archive to be stored on the volume. As may be contemplated, the indices (whether sparse or otherwise), may be determined prior to actually storing the archives on the respective volumes. In some embodiments, a space may be reserved on the volumes so as to generate and/or write the appropriate indices after the archives have been written to the volumes 906.

In some embodiments, the sparse indices are used in connection with information relating to the sort order of the archives so as to locate archives without necessitating the use of dense indices, for example, those that account for every archive on a given volume. Such sort order-related information may reside on the volumes 906 or, in some embodiments, on an entity separate from the volumes 906, such as in a data store or other resource of a computing resource service provider. Similarly, the indices may be stored on the same volumes 906 to which they apply, or, in some embodiments, separately from such volumes 906.

The archives may be stored, bit for bit (e.g., the "original data" of the archives), on a subset of the plurality of volumes 906. Also as mentioned, appropriate indices may also be stored on the applicable subset of the plurality of volumes 906. The original data of the archives is stored as a plurality of shards across a plurality of volumes, the quantity of which (either shards or volumes, which in some cases may have a one to one relationship) may be predetermined according to various factors, including the number of total shards that may be used to reconstruct the original data using a redundancy encode. In some embodiments, the number of volumes used to store the original data of the archives is the quantity of shards that may be used to reconstruct the original data from a plurality of shards generated by a redundancy code from the original data. As an example, FIG. 9 illustrates five volumes, three of which contain original data archives 908 and two of which contain derived data 910, such as redundancy encoded data. In the illustrated example, the redundancy code used may require any three shards to regenerate original data, and therefore, a quantity of three volumes may be used to write the original data (even prior to any application of the redundancy code).

The volumes 906 bearing the original data archives 908 may each contain or be considered as shards unto themselves. For example, the data 902 from preliminary storage may be copied directly only to a volume if, as described herein, it is stored in preliminary storage as an identity shard. In embodiments where the sort order-related information and/or the indices are stored on the applicable volumes 906, they may be included with the original data of the archives and stored therewith as shards, as previously mentioned. In the illustrated example, the original data archives 908 are stored as three shards (which may include the respective indices) on three associated volumes 906. In some embodiments, the original data archives 908 (and, in embodiments where the indices are stored on the volumes, the indices) are processed by an entity associated with, for example, the archival storage service, using a redundancy code, such as an erasure code, so as to generate the remaining shards, which contain encoded information rather than the original data of the original data archives. The original data archives 908 may be processed using the redundancy code at any time after being sorted, such as prior to being stored on the volumes, contemporaneously with such storage, or after such storage.

Such encoded information may be any mathematically computed information derived from the original data, and depends on the specific redundancy code applied. As mentioned, the redundancy code may include erasure codes (such as online codes, Luby transform codes, raptor codes, parity codes, Reed-Solomon codes, Cauchy codes, Erasure Resilient Systematic Codes, regenerating codes, or maximum distance separable codes) or other forward error correction codes. In some embodiments, the redundancy code may implement a generator matrix that implements mathematical functions to generate multiple encoded objects correlated with the original data to which the redundancy code is applied. In some of such embodiments, an identity matrix is used, wherein no mathematical functions are applied and the original data (and, if applicable, the indices) are allowed to pass straight through. In such embodiments, it may be therefore contemplated that the volumes bearing the original data (and the indices) may correspond to objects encoded from that original data by the identity matrix rows of the generator matrix of the applied redundancy code, while volumes bearing derived data correspond to other rows of the generator matrix. In the example illustrated in FIG. 9, the five volumes 906 include three volumes that have shards (e.g., identity shards) corresponding to the original data of the original data archives 908, while two have encoded shards corresponding to the derived data 910 (also referred to herein as "derived shards"). As illustrated in FIG. 9, the three original data archives 908, and the two encoded shards corresponding to the derived data 910 form a bundle 918 (denoted by the dashed line). In this example, the applied redundancy code may result in the data being stored in a "3:5" scheme, wherein any three shards of the five stored shards are required to regenerate the original data, regardless of whether the selected three shards contain the original data or the derived data.

In some embodiments, if one of the volumes 906 or a shard stored thereon is detected as corrupt, missing, or otherwise unavailable, a new shard may be generated using the redundancy code applied to generate the shard(s) in the first instance. The new shard may be stored on the same volume or a different volume, depending, for example, on whether the shard is unavailable for a reason other than the failure of the volume. The new shard may be generated by, for example, the data storage system 904, by using a quantity of the remaining shards that may be used to regenerate the original data (and the index, if applicable) stored across all volumes, regenerating that original data, and either replacing the portion of the original data corresponding to that which was unavailable (in the case that the unavailable shard contains original data), or reapplying the redundancy code so as to provide derived data for the new shard.

As previously discussed, in some embodiments, the new shard may be a replication of the unavailable shard, such as may be the case if the unavailable shard includes original data of the archive(s). In some embodiments, the new shard may be selected from a set of potential shards as generated by, for example, a generator matrix associated with the redundancy code, so as to differ in content from the unavailable shard (such as may be the case if the unavailable shard was a shard generated from the redundancy code, and therefore contains no original data of the archives). As discussed throughout this disclosure, the shards and/or volumes may be grouped and/or layered.

In some embodiments, retrieval of an archive stored in accordance with the techniques described herein may be requested by a client entity under control of a customer of the computing resource service provider and/or the archival storage service provided therefrom, as described in further detail throughout this disclosure. In response to the request, the data storage system 904 may locate, based on information regarding the sort order of the archives as stored on the volumes 906, the specific volume on which the archive is located. Thereafter, the index or indices may be used to locate the specific archive, whereupon it may be read from the volume and provided to a requesting client entity. In embodiments where sparse indices are employed, the sort order information may be used to locate the nearest location (or archive) that is sequentially prior to the requested archive, whereupon the volume is sequentially read from that location or archive until the requested archive is found. In embodiments where multiple types of indices are employed, the data storage system 904 may initially determine which of the indices includes the most efficient location information for the requested archive based on assessing the criteria used to deploy the multiple types of indices in the first instance. For example, if archives under a specific size are indexed in a sparse index and archives equal to or over that size are indexed in a parallel dense index, the data storage system 904 may first determine the size of the requested archive, and if the requested archive is larger than or equal to the aforementioned size boundary, the dense index may be used so as to more quickly obtain the precise location of the requested archive.

In some embodiments, the volumes 906 may be grouped such that each given volume has one or more cohorts 916. In such embodiments, a volume set (e.g., all of the illustrated volumes 906) may be implemented such that incoming archives to be stored on the volumes are apportioned to one or more failure-decorrelated subsets of the volume set. The failure-decorrelated subsets may be some combination of the volumes 906 of the volume subset, where the quantity of volumes correlates to a number of shards required for the implemented redundancy code. In the illustrated example, the overall volume set may comprise two failure-decorrelated subsets (volumes in a horizontal row) where a given constituent volume is paired with a cohort (e.g., the cohort 916). In some embodiments, the incoming archives are apportioned to one or more of the cohorts in the failure-decorrelated subset according to, for example, a predetermined sequence, based on one or more attributes of the incoming archives, and the like.

The illustrated example shows, for clarity, a pair-wise cohort scheme, though other schemes are contemplated as within scope of this disclosure, some of which are outlined in greater detail herein. In the illustrated example, some of the volumes of the volume set store original data of incoming archives (e.g., original data archives 908 and/or original data archives 912), while others store derived data (e.g., derived data 910 and derived data 914). The data storage system 904 may implement a number of failure-decorrelated subsets to which to store the incoming archives, and in the pair-wise scheme pictured, the volumes used for a given archive may differ based on some arbitrary or predetermined pattern. As illustrated, some archives may be apportioned to volumes of a given cohort that are assigned to one pattern, or failure-decorrelated subset as shown by original data archives 908 and derived data 910, while others are apportioned to volumes in a different pattern as shown by original data archives 912 and derived data 914. The patterns, as mentioned, may be arbitrary, predefined, and/or in some cases, sensitive to attributes of the incoming data. In some embodiments, patterns may not be used at all, and the member volumes of a given failure-decorrelated subset may be selected randomly from a pool of volumes in the volume set.

Figure 10:
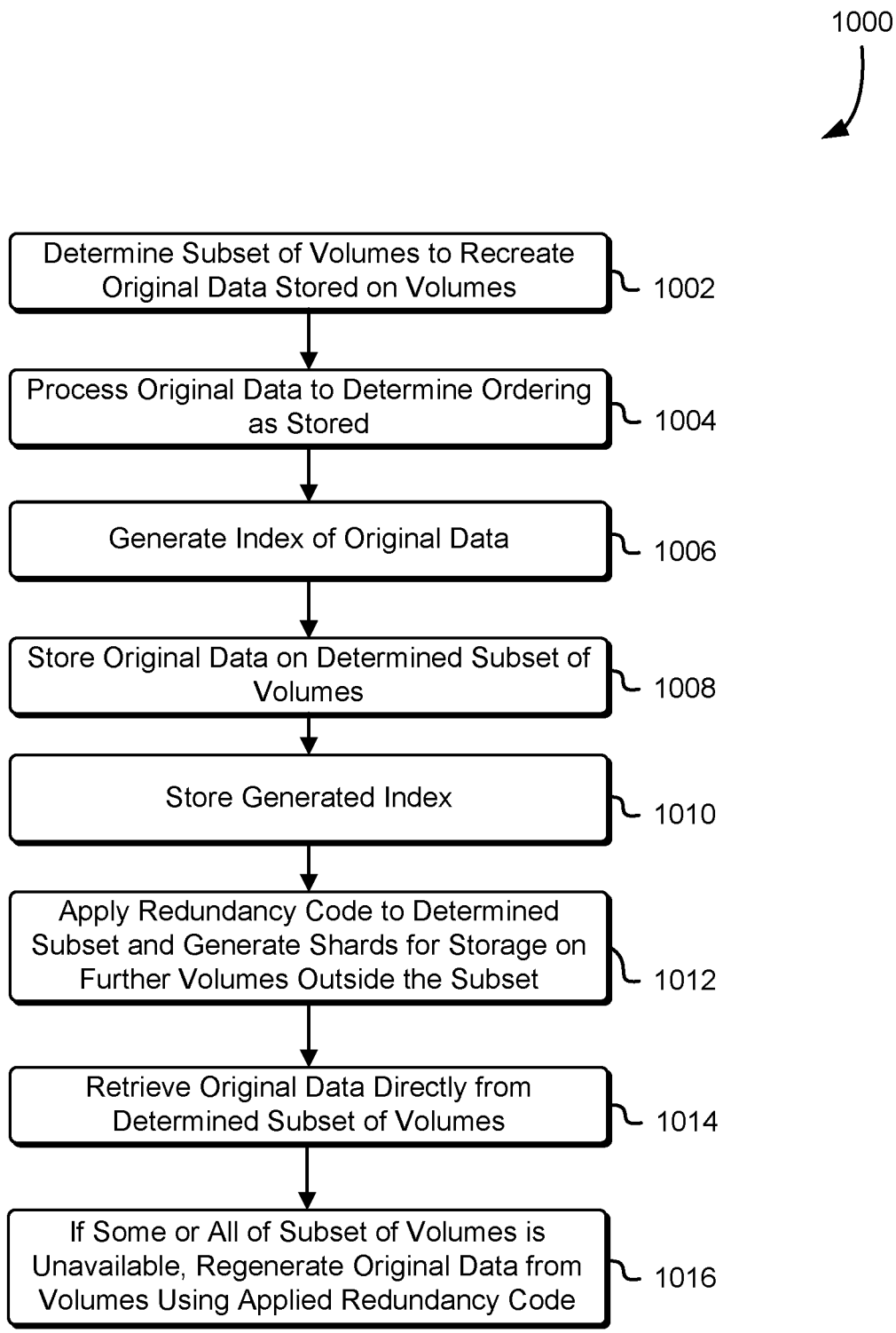
FIG. 10 illustrates an example process for applying redundancy encoding techniques to data stored in durable storage in accordance with at least one embodiment.

FIG. 10 illustrates an example process 1000 for applying redundancy encoding techniques to data stored in durable storage as described herein and in accordance with at least one embodiment. The example process 1000 illustrated in FIG. 10 illustrates the processing, indexing, storing, and retrieving of data stored on a data storage system. The data may be retrieved from preliminary storage as described herein. The example process 1000 illustrated in FIG. 10 may be used in conjunction with a grid encoding technique such that described in connection with FIG. 8, in conjunction with a bundle encoding technique such as that described in connection with FIG. 9, or with some other redundancy encoding technique. A data storage service may perform the example process 1000 illustrated in FIG. 10.

At step 1002, a resource of a data storage system, such as that implementing a redundancy code to store archives, determines which subset (e.g., quantity) of a plurality of volumes that may be used to recreate the original data to be stored, based on, for example, a redundancy code to be applied to the archives. For example, in accordance with the techniques described above in connection with FIG. 9, such information may be derived from predetermining the parameters of an erasure code with a specified ratio of shards that may be used to regenerate the original data from which they derive to the total number of shards generated from the application of the erasure code.

At step 1004, original data, such as original data of archives received from customers of, for example, a data storage system or a computing resource service provider as described in further detail herein, is sorted by, for example, the data storage system or associated entity. For example, the sort order may be implemented on one or more attributes of the incoming data.

At step 1006, one or more indices, such as sparse indices, are generated by, for example, the data storage system, for the original data. For example, there may be more than one index for a given volume, and such parallel indices may be of different types depending on the nature of the archives and/or original data being stored.

At step 1008, the original data is stored, for example, by the data storage system, on the subset of volumes determined in connection with step 1002, and in the order determined in step 1004. Additionally, at step 1010, the index generated in step 1006 is stored, for example, by the data storage system, on an appropriate entity. For example, the index may be stored as part of a shard on which the original data is stored, or, in some embodiments, may be stored on a separate resource from that which persists the volume.

At step 1012, the redundancy code is applied, for example, by the data storage system, to the determined subset of volumes (e.g., shards, as previously described herein), and additional shards containing data derived from the application of the redundancy code are stored on a predetermined quantity of volumes outside the subset determined in connection with step 1002. For example, the ratio of volumes (e.g., shards as previously described herein) storing the original data to the overall quantity of volumes (including those storing the derived data generated in this step 1012) may be prescribed by the recovery/encoding ratio of the redundancy code applied herein.

At step 1014, in normal operation, requested data may be retrieved, for example, by the data storage system, directly from the subset of volumes storing the original data, without necessitating retrieval and further processing (e.g., by the redundancy code) from the volumes storing the derived data generated in step 1012. However, at step 1016, if any of the volumes are determined, for example, by the data storage system, to be unavailable, a replacement shard may be generated by the data storage system by reconstructing the original data from a quorum of the remaining shards, and re-encoding using the redundancy code to generate the replacement shard. The replacement shard may be the same or may be different from the shard detected as unavailable.

Figure 11:
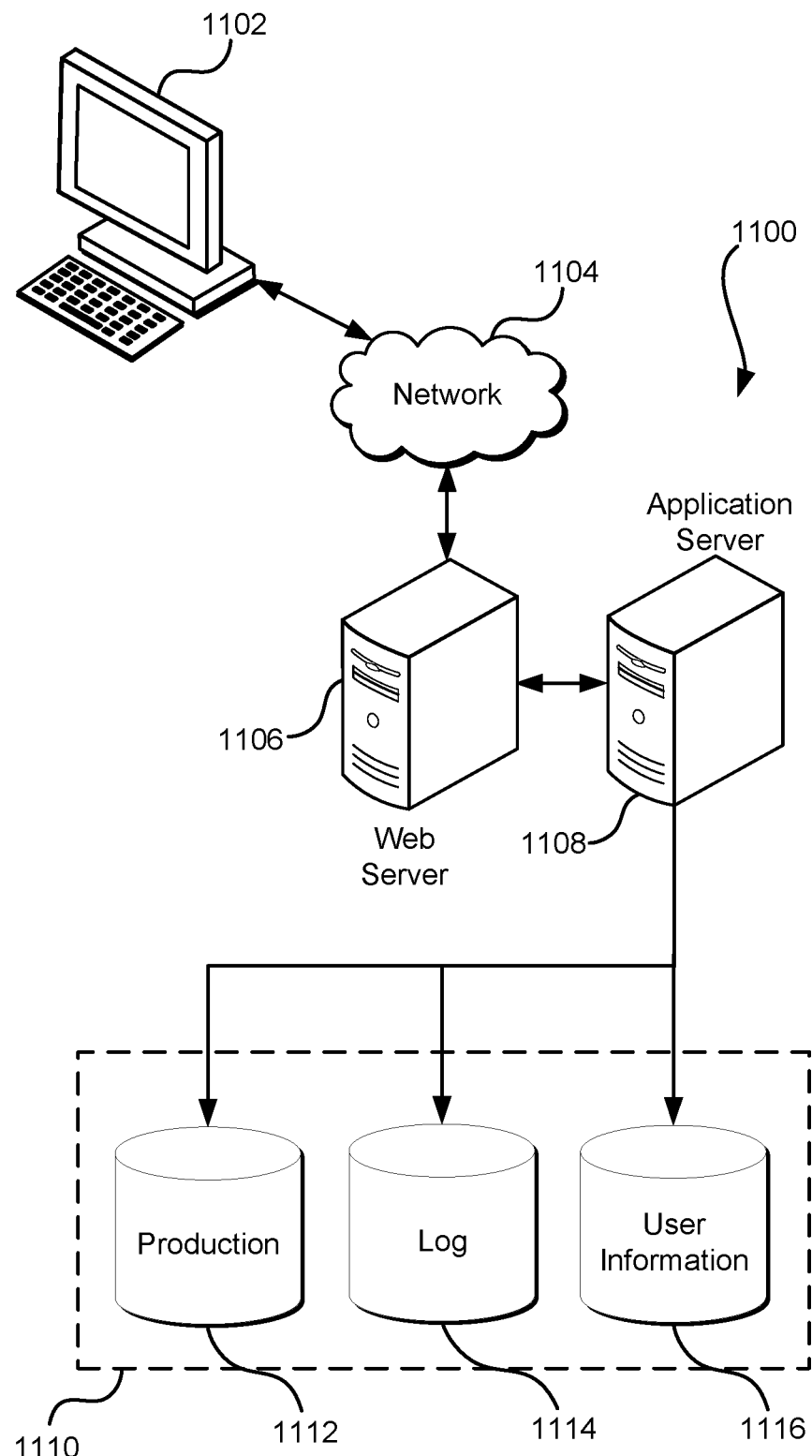
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes, and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices, or processing devices, which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    generating a sorted archive table for a plurality of archives to be stored in a data storage vault by at least:
        sorting the plurality of archives according to a respective upload time associated with each archive of the plurality of archives; and
        sorting two or more archives that have the same upload time using values of respective identifiers associated with the two or more archives;
    identifying a sequence of time points based on the sorted archive table, such that successive time intervals of the sequence of time points are associated with matching aggregate byte lengths of data in the sorted plurality of archives;
    defining, in a slice map, a plurality of slices, such that each slice of the plurality of slices is defined by two consecutive time points of the sequence of time points, the slice map arranged such that the plurality of slices reflects a monotonicity of upload times of the plurality of archives;
    associating, in the slice map, each slice of the plurality of slices with a respective image of archive data to be written to a data storage device associated with the data storage vault;
    using a plurality of parallel worker threads to process a plurality of work items, the processing of the plurality of work items causing the parallel worker threads to store the plurality of slices to a data storage device, such that the monotonicity of upload times is preserved, and such that the plurality of work items has a sort order corresponding to a sort order of the plurality of archives; and
    using the slice map to locate one or more slices associated with a requested archive based at least in part on a distinct identifier associated with the sorted archive table that is determined based on a self-describing identifier associated with the requested archive.

2. The computer-implemented method of claim 1, further comprising:
    receiving a request to retrieve an archive of the plurality of archives;
    determining, based on a self-identifying identifier associated with the requested archive, an upload time for the archive, a unique identifier associated with the sorted archive table, and a size of the requested archive;
    based at least in part on the upload time for the requested archive, the unique identifier, and the size of the requested archive, using the slice map to locate one or more slices associated with the requested archive;
    retrieving, from the data storage vault, one or more images associated with the one or more slices; and
    providing, from the retrieved one or more images, the requested archive.

3. The computer-implemented method of claim 1, further comprising:
    receiving the plurality of archives in response to one or more requests to store the plurality of archives in the data storage vault;
    generating, using a work item generator implemented by a distributed computing service provider, a plurality of work items from the plurality of archives, the plurality of work items each with a uniform size;
    cataloging, using the work item generator, the plurality of work items in a work item map;
    preparing, for storage in the data storage vault, the work items using an archive processor of the distributed computing service provider, the archive processor including two or more parallel workers performing the preparing;
    assembling, using an image assembler of the distributed computing service provider, the prepared work items into the respective image in the slice map in the monotonic sort order reflected in the work item map; and
    writing the respective image to one or more data storage devices of the data storage vault.

4. The computer-implemented method of claim 3, wherein the parallel workers determine one or more work items of the plurality of work items to process based at least in part on a status flag that indicates whether the work items were committed to an image.

5. A system, comprising:
    at least one computing device configured to implement one or more services, wherein the one or more services:

sort, in a sort order, a plurality of archives to be stored in a data storage system, at least according to upload times associated with each archive of the plurality of archives;

define a plurality of time points based at least in part on the sort order, such that each extent of data between a first time point of the plurality of time points and a second, subsequent time point of the plurality of time points is of equivalent size;

store, on the data storage system, a plurality of data extents defined by the plurality of time points, the storage of the plurality of data extents performed by a plurality of parallel workers that preserve the sort order of the plurality of archives, the plurality of parallel workers processing a plurality of work items, the work items having a sort order corresponding to a sort order of the plurality of archives;

provide access to the plurality of archives via the stored plurality of data extents and a map that reflects at least the plurality of time points; and use the map to locate one or more data extents associated with a requested archive based at least in part on a distinct identifier associated with the plurality of archives that is determined based on a self-describing identifier associated with the requested archive.

6. The system of claim 5, wherein the one or more services further define the plurality of time points in a monotonic, sequential order in connection with an order in which the archives of the plurality of archives is processed by the system.

7. The system of claim 6, wherein each of the plurality of time points is predetermined.

8. The system of claim 7, wherein the extents of data include a first byte associated with a first time point of the plurality of time points and end on a byte immediately preceding a different byte associated with a second time point immediately subsequent to the first time point.

9. The system of claim 5, wherein the plurality of time points is defined as a set of invariant keys in a key-value store.

10. The system of claim 5, wherein the access is provided via an application programming interface provided by the system.

11. The system of claim 5, wherein the one or more services further processes the plurality of data extents with one or more redundancy codes prior to storage.

12. The system of claim 5, wherein an initial time point of the plurality of time points is an epoch time point.

13. A non-transitory computer-readable storage medium storing thereon executable instructions that, as a result of being executed by one or more processors of a computer system, cause the computer system to at least:

process a plurality of archives to be stored in a data storage system by at least:

generating an index of the plurality of archives that is sorted at least according to upload times associated with each archive of the plurality of archives;

defining a plurality of time points based at least in part on continuity of the index, such that individual slices of data between a first time point of the plurality of time points and a second, subsequent time point of the plurality of time points are of equivalent size;

preparing, for storage, data associated with a plurality of slices as defined by the plurality of time points by at least compressing the data;

storing the prepared data in connection with a map that associates the compressed data with two consecutive time points of the plurality of time points, the storage of the prepared data performed by parallel worker threads that preserve a storage ordering of the prepared data in accordance with an ordering in the index, the plurality of parallel worker threads processing a plurality of work items, the work items having a sort order corresponding to a sort order of the plurality of archives; and using the map to locate one or more slices associated with a requested archive based at least in part on an identifier associated with the plurality of archives that is determined based on a requested archive identifier associated with the requested archive.

14. The non-transitory computer-readable storage medium of claim 13, wherein the executable instructions further comprise instructions that, as a result of being executed by the one or more processors, cause the computer system to prepare the data by encrypting the data prior to storage.

15. The non-transitory computer-readable storage medium of claim 13, wherein the index is a key-value store.

16. The non-transitory computer-readable storage medium of claim 13, wherein the executable instructions further comprise instructions that, as a result of being executed by the one or more processors, cause the computer system to receive the plurality of archives in connection with one or more requests to store the archives.

17. The non-transitory computer-readable storage medium of claim 13, wherein the plurality of slices are each of a size corresponding to a predetermined partition size.

18. The non-transitory computer-readable storage medium of claim 17, wherein the predetermined partition size is calculated in connection with one or more physical characteristics of one or more data storage devices on which the plurality of slices are to be stored.

19. The non-transitory computer-readable storage medium of claim 18, wherein the one or more data storage devices are tape storage devices.

20. The non-transitory computer-readable storage medium of claim 13, wherein the executable instructions that cause the computer system to prepare the data for storage further include instructions that cause the computer system to allocate a plurality of workers to prepare work items associated with the plurality of slices in a distributed fashion.

* * * * *